United States Patent
Pringle, IV et al.

(10) Patent No.: US 10,913,089 B2
(45) Date of Patent: Feb. 9, 2021

(54) METHODS FOR APPLYING GLUTINOUS SUBSTANCES

(71) Applicant: The Boeing Company, Chicago, IL (US)

(72) Inventors: John W. Pringle, IV, Gardena, CA (US); John J. Brown, Costa Mesa, CA (US); Angelica Davancens, Reseda, CA (US); Frederick B. Frontiera, Mt. Pleasant, SC (US); Martin Guirguis, Long Beach, CA (US); Raul Tomuta, Stanton, CA (US); Richard P. Topf, Orange, CA (US); Don D. Trend, Huntington Beach, CA (US); Jake B. Weinmann, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 15/989,048

(22) Filed: May 24, 2018

(65) Prior Publication Data
US 2018/0264505 A1 Sep. 20, 2018

Related U.S. Application Data

(62) Division of application No. 15/009,431, filed on Jan. 28, 2016, now Pat. No. 10,105,728.

(Continued)

(51) Int. Cl.
*B05C 9/02* (2006.01)
*B25J 15/04* (2006.01)
(Continued)

(52) U.S. Cl.
CPC ............... *B05C 9/02* (2013.01); *A46B 11/06* (2013.01); *A46B 13/04* (2013.01); *B05C 5/02* (2013.01);
(Continued)

(58) Field of Classification Search
CPC .. B05C 9/02; B05C 5/02; B05C 11/10; B05C 11/1002; B05D 7/24
See application file for complete search history.

(56) References Cited

U.S. PATENT DOCUMENTS

| 4,067,476 A | 1/1978 | Moline et al. |
| 4,513,474 A | 4/1985 | Watabe |
(Continued)

FOREIGN PATENT DOCUMENTS

| CN | 1332657 | 1/2002 |
| CN | 1353628 | 6/2002 |
(Continued)

OTHER PUBLICATIONS

Notice of Allowance for U.S. Appl. No. 15/009,765 dated Jul. 16, 2018.

(Continued)

*Primary Examiner* — Kelly M Gambetta
(74) *Attorney, Agent, or Firm* — Kunzler Bean & Adamson

(57) ABSTRACT

A method of delivering a glutinous substance from a cartridge to an applicator is disclosed. The method comprises receiving the cartridge inside a sleeve through an inlet of the sleeve while a pressure cap is in an open position. The method also comprises moving the pressure cap into a closed position to sealingly couple the pressure cap with a trailing end of the cartridge and to sealingly couple the applicator with a leading end of the cartridge. The method further comprises applying pressure to the glutinous substance in the cartridge through the pressure input of the pressure cap to urge the glutinous substance from the cartridge into the applicator. Additionally, the method comprises moving the pressure cap into the open position to (Continued)

provide sufficient clearance sufficient for removal of the cartridge from the sleeve through the inlet of the sleeve.

20 Claims, 14 Drawing Sheets

Related U.S. Application Data

(60) Provisional application No. 62/242,216, filed on Oct. 15, 2015.

(51) Int. Cl.

| | |
|---|---|
| B23Q 3/155 | (2006.01) |
| B23P 19/02 | (2006.01) |
| B23P 19/04 | (2006.01) |
| B25J 9/16 | (2006.01) |
| B25J 11/00 | (2006.01) |
| B05C 5/02 | (2006.01) |
| B05D 7/24 | (2006.01) |
| B05C 11/10 | (2006.01) |
| A46B 13/04 | (2006.01) |
| A46B 11/06 | (2006.01) |
| B05C 1/06 | (2006.01) |
| B05C 1/02 | (2006.01) |

(52) U.S. Cl.
CPC .......... *B05C 11/10* (2013.01); *B05C 11/1002* (2013.01); *B05D 7/24* (2013.01); *B23P 19/02* (2013.01); *B23P 19/04* (2013.01); *B23Q 3/15566* (2013.01); *B25J 9/1679* (2013.01); *B25J 9/1692* (2013.01); *B25J 11/0075* (2013.01); *B25J 15/0491* (2013.01); *B05C 1/027* (2013.01); *B05C 1/06* (2013.01); *B23Q 2003/1558* (2013.01); *B23Q 2003/15537* (2016.11); *Y10S 483/901* (2013.01); *Y10S 901/02* (2013.01); *Y10S 901/43* (2013.01); *Y10T 29/49815* (2015.01); *Y10T 29/49819* (2015.01); *Y10T 483/17* (2015.01)

(56) References Cited

U.S. PATENT DOCUMENTS

| | | | |
|---|---|---|---|
| 4,765,575 | A | 8/1988 | Bergl et al. |
| 4,793,110 | A | 12/1988 | Tucker |
| 4,808,063 | A | 2/1989 | Haley et al. |
| 4,953,756 | A | 9/1990 | Breault et al. |
| 5,102,010 | A | 4/1992 | Osgar et al. |
| 5,263,608 | A | 11/1993 | Kiernan et al. |
| 5,316,252 | A | 5/1994 | Charnow et al. |
| 5,452,824 | A | 9/1995 | Danek et al. |
| 5,462,199 | A | 10/1995 | Lenhardt et al. |
| 5,598,973 | A | 2/1997 | Weston et al. |
| 5,628,531 | A | 5/1997 | Rosenberg et al. |
| 5,680,967 | A | 10/1997 | Dang et al. |
| 5,782,410 | A | 7/1998 | Weston et al. |
| 5,857,796 | A | 1/1999 | Waldmann |
| 5,863,146 | A | 1/1999 | Denkins et al. |
| 6,082,597 | A | 7/2000 | Beckett et al. |
| 6,223,941 | B1 | 5/2001 | Nealey et al. |
| 6,267,266 | B1 | 7/2001 | Smith et al. |
| 7,020,539 | B1 | 3/2006 | Kovacevic et al. |
| 7,922,107 | B2 | 4/2011 | Fox |
| 8,651,046 | B1 | 2/2014 | Davancens et al. |
| 2002/0112821 | A1 | 8/2002 | Inaba et al. |
| 2005/0277530 | A1 | 12/2005 | Prust et al. |
| 2007/0017072 | A1 | 1/2007 | Serio et al. |
| 2008/0105703 | A1 | 5/2008 | Prentice et al. |
| 2009/0008398 | A1 | 1/2009 | Nakatsuji et al. |
| 2009/0065532 | A1* | 3/2009 | Lafond ............... B05C 17/0146 222/389 |
| 2011/0121035 | A1 | 5/2011 | Greter et al. |
| 2011/0300295 | A1 | 12/2011 | Clark et al. |
| 2012/0325864 | A1 | 12/2012 | Imaizumi et al. |
| 2013/0177870 | A1 | 7/2013 | Wang et al. |
| 2014/0158717 | A1 | 6/2014 | Ettlin et al. |
| 2014/0234011 | A1 | 8/2014 | Tomuta et al. |
| 2014/0326760 | A1 | 11/2014 | Topf et al. |
| 2015/0028051 | A1* | 1/2015 | Topf ................... B05C 11/1013 222/1 |
| 2015/0083751 | A1 | 3/2015 | Aigner et al. |
| 2016/0207202 | A1 | 7/2016 | Lee et al. |
| 2017/0105516 | A1 | 4/2017 | Pringle, IV et al. |
| 2017/0106395 | A1 | 4/2017 | Pringle, IV et al. |
| 2017/0106398 | A1 | 4/2017 | Pringle, IV et al. |
| 2017/0106400 | A1 | 4/2017 | Pringle, IV et al. |
| 2017/0106402 | A1 | 4/2017 | Pringle, IV et al. |
| 2019/0344304 | A1 | 11/2019 | Pringle et al. |
| 2020/0078818 | A1 | 3/2020 | Pringle, IV et al. |

FOREIGN PATENT DOCUMENTS

| | | |
|---|---|---|
| CN | 1757438 | 4/2006 |
| CN | 1849486 | 10/2006 |
| CN | 1986075 | 6/2007 |
| CN | 101267996 | 9/2008 |
| CN | 201618665 | 11/2010 |
| CN | 103567120 | 2/2014 |
| CN | 204182532 | 3/2015 |
| CN | 104768658 | 7/2015 |
| CN | 204523390 | 8/2015 |
| EP | 2842457 | 3/2015 |
| JP | 2013-031805 | 2/2013 |
| JP | 2014061517 | 4/2014 |
| WO | 9810251 | 3/1998 |

OTHER PUBLICATIONS

Notice of Allowance for U.S. Appl. No. 15/253,227 dated Sep. 6, 2018.
Aerospace Dispensing Systems, Fori's New Aerospace Division Blog dated Oct. 3, 2013, http://fori-aerospace.blogspot.com/2013/10/aerospace-dispensing-systems.html, Fori Automation, Inc., accessed Jun. 2, 2016.
Extended European Search Report for European Application No. 16193731.3 dated Mar. 7, 2017.
Notice of Allowance for U.S. Appl. No. 15/253,182 dated Apr. 9, 2018.
Office Action for U.S. Appl. No. 15/253,227 dated Apr. 20, 2018.
Canadian Office Action for Canadian Patent Application No. 2,945,423 dated Nov. 5, 2019.
Chinese Office Action for CN Patent Application No. 201610899187.2 dated Feb. 3, 2020.
Chinese Office Action for CN Patent Application No. 201610899745.5 dated Feb. 6, 2020.
Chinese Office Action for CN Patent Application No. 201610898893.5 dated Feb. 3, 2020.
Chinese Office Action for CN Patent Application No. 2016108909721.1 dated Feb. 3, 2020.
Japanese Office Action for JP Patent Application No. 2016-119659 dated Jun. 15, 2020.
Chinese Office Action for CN Patent Application No. 2016108909721 dated Sep. 25, 2020.

* cited by examiner

202
RECEIVING THE CARTRIDGE (166) INSIDE A SLEEVE (106) THROUGH AN INLET (124) OF THE SLEEVE (106) WHILE A PRESSURE CAP (110), LOCATED PROXIMATE THE INLET (124) OF THE SLEEVE (106), IS IN AN OPEN POSITION, WHEREIN THE CARTRIDGE (166) HAS A LEADING END (167) AND A TRAILING END (169)

204
MOVING THE PRESSURE CAP (110), LOCATED PROXIMATE THE INLET (124) OF THE SLEEVE (106), INTO A CLOSED POSITION TO SEALINGLY COUPLE THE PRESSURE CAP (110) WITH THE TRAILING END (169) OF THE CARTRIDGE (166) AND TO SEALINGLY COUPLE THE APPLICATOR (154) WITH THE LEADING END (167) OF THE CARTRIDGE (166)

210
THE PRESSURE CAP (110) IS PIVOTALLY COUPLED TO AN ARM (115)

212
ROTATING THE ARM (115) IN A FIRST ROTATIONAL DIRECTION ABOUT AN AXIS (117) THAT IS FIXED RELATIVE TO THE SLEEVE (106) AND THAT IS PERPENDICULAR TO A CENTRAL AXIS (121) OF THE SLEEVE (106)

214
PIVOTALLY BIASING THE PRESSURE CAP (110) RELATIVE TO THE ARM (115)

206
APPLYING PRESSURE TO THE GLUTINOUS SUBSTANCE (168) IN THE CARTRIDGE (166) THROUGH A PRESSURE INPUT (118) OF THE PRESSURE CAP (110) TO URGE THE GLUTINOUS SUBSTANCE (168) FROM THE CARTRIDGE (166) INTO THE APPLICATOR (154)

216
APPLYING PRESSURE TO THE GLUTINOUS SUBSTANCE (168) IN THE CARTRIDGE (166) THROUGH THE PRESSURE INPUT (118) OF THE PRESSURE CAP (110) COMPRISES INTRODUCING A PRESSURIZED GAS INTO THE CARTRIDGE (166) THROUGH THE PRESSURE INPUT (118)

218
SENSING A PRESSURE OF THE GLUTINOUS SUBSTANCE (168) IN THE APPLICATOR (154), WHEREIN THE PRESSURE APPLIED TO THE GLUTINOUS SUBSTANCE (168) IN THE CARTRIDGE (166) THROUGH THE PRESSURE INPUT (118) OF THE PRESSURE CAP (110) VARIES RESPONSIVE TO, AT LEAST IN PART, THE PRESSURE OF THE GLUTINOUS SUBSTANCE (168) SENSED IN THE APPLICATOR (154)

220
SENSING A TEMPERATURE OF THE GLUTINOUS SUBSTANCE (168) IN THE APPLICATOR (154), WHEREIN THE PRESSURE APPLIED TO THE GLUTINOUS SUBSTANCE (168) IN THE CARTRIDGE (166) THROUGH THE PRESSURE INPUT (118) OF THE PRESSURE CAP (110) VARIES RESPONSIVE TO, AT LEAST IN PART, THE TEMPERATURE OF THE GLUTINOUS SUBSTANCE (168) SENSED IN THE APPLICATOR (154)

208
MOVING THE PRESSURE CAP (110) INTO AN OPEN POSITION TO PROVIDE CLEARANCE SUFFICIENT FOR REMOVAL OF THE CARTRIDGE (166) FROM THE SLEEVE (106) THROUGH THE INLET (124) OF THE SLEEVE (106)

222
ROTATING THE ARM (115) ABOUT THE AXIS (117) IN A SECOND ROTATIONAL DIRECTION, OPPOSITE THE FIRST ROTATIONAL DIRECTION

METHODS FOR APPLYING GLUTINOUS SUBSTANCES

BACKGROUND

Glutinous substances, such as sealants, adhesives, and fillers, are applied to surfaces of structures or other objects for purposes of sealing, corrosion resistance, and/or fixation, among others. Various manual tools for application of glutinous substances are commercially available. However, manual application of glutinous substances is labor-intensive, time-consuming, and difficult to control to a precise tolerance.

SUMMARY

Accordingly, systems, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an apparatus for delivering a glutinous substance from a cartridge to an applicator. The apparatus comprises a sleeve, comprising a central axis, an inlet, and an outlet opposite the inlet. The sleeve is configured to receive the cartridge through the inlet. Additionally, the apparatus comprises a pressure-cap assembly coupled to the sleeve. The pressure-cap assembly comprises a pressure cap proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet of the sleeve. The pressure cap comprises a pressure input, through which pressure is selectively applied to the glutinous substance in the cartridge when the cartridge is received within the sleeve, the pressure cap is in the closed position, and a leading end of the cartridge is in sealed engagement with the applicator. The pressure-cap assembly further comprises an actuator, coupled to the pressure cap and to the sleeve. The actuator is selectively operable to move the pressure cap relative to the sleeve between, inclusively, the closed position and the open position. The apparatus also comprises an applicator interface proximate the outlet of the sleeve. The applicator interface is configured to releasably retain the applicator so that the applicator is sealingly coupled with the leading end of the cartridge when the pressure cap is in the closed position.

Another example of the subject matter according to the present disclosure relates to a system for delivering a glutinous substance from a cartridge to a surface of a workpiece. The system comprises a robot, comprising a tool interface, an applicator, and an apparatus for delivering the glutinous substance from the cartridge to the applicator. The apparatus comprises a robot interface, configured to be coupled to the tool interface of the robot. The apparatus also comprises a sleeve, comprising a central axis, an inlet, and an outlet opposite the inlet. The sleeve is configured to receive the cartridge through the inlet. The apparatus also comprises a pressure-cap assembly, coupled to the sleeve. The pressure-cap assembly comprises a pressure cap proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet of the sleeve. The pressure cap comprises a pressure input, through which pressure is selectively applied to the glutinous substance in the cartridge when the cartridge is received within the sleeve, the pressure cap is in the closed position, and a leading end of the cartridge is in sealed engagement with the applicator. The pressure-cap assembly also comprises an actuator, coupled to the pressure cap and to the sleeve. The actuator is selectively operable to move the pressure cap relative to the sleeve between, inclusively, the closed position and the open position. The apparatus also comprises an applicator interface proximate the outlet of the sleeve. The applicator interface is configured to releasably hold the applicator so that the applicator is sealingly coupled with the leading end of the cartridge when the pressure cap is in the closed position and a controller. The controller is operatively coupled with the robot and the apparatus.

Yet another example of the subject matter according to the present disclosure relates to a method of delivering a glutinous substance from a cartridge to an applicator. The method comprises receiving the cartridge inside a sleeve through an inlet of the sleeve while a pressure cap, located proximate the inlet of the sleeve, is in an open position. The cartridge has a leading end and a trailing end. The method also comprises moving the pressure cap, located proximate the inlet of the sleeve, into a closed position to sealingly couple the pressure cap with the trailing end of the cartridge and to sealingly couple the applicator with the leading end of the cartridge. The method further comprises applying pressure to the glutinous substance in the cartridge through a pressure input of the pressure cap to urge the glutinous substance from the cartridge into the applicator. Additionally, the method comprises moving the pressure cap into an open position to provide clearance sufficient for removal of the cartridge from the sleeve through the inlet of the sleeve.

BRIEF DESCRIPTION OF THE DRAWINGS

Figure 1:
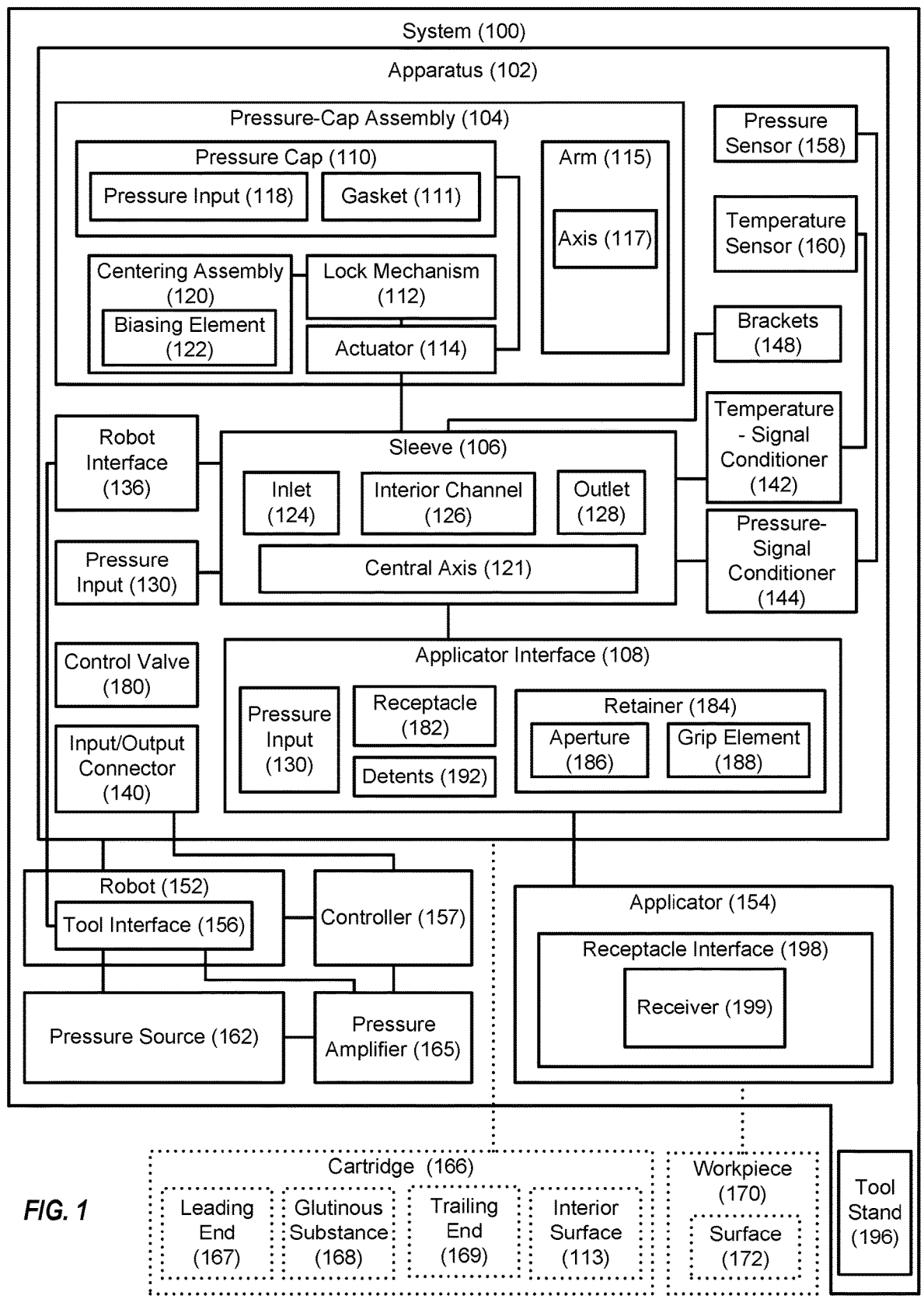
Figure 2:
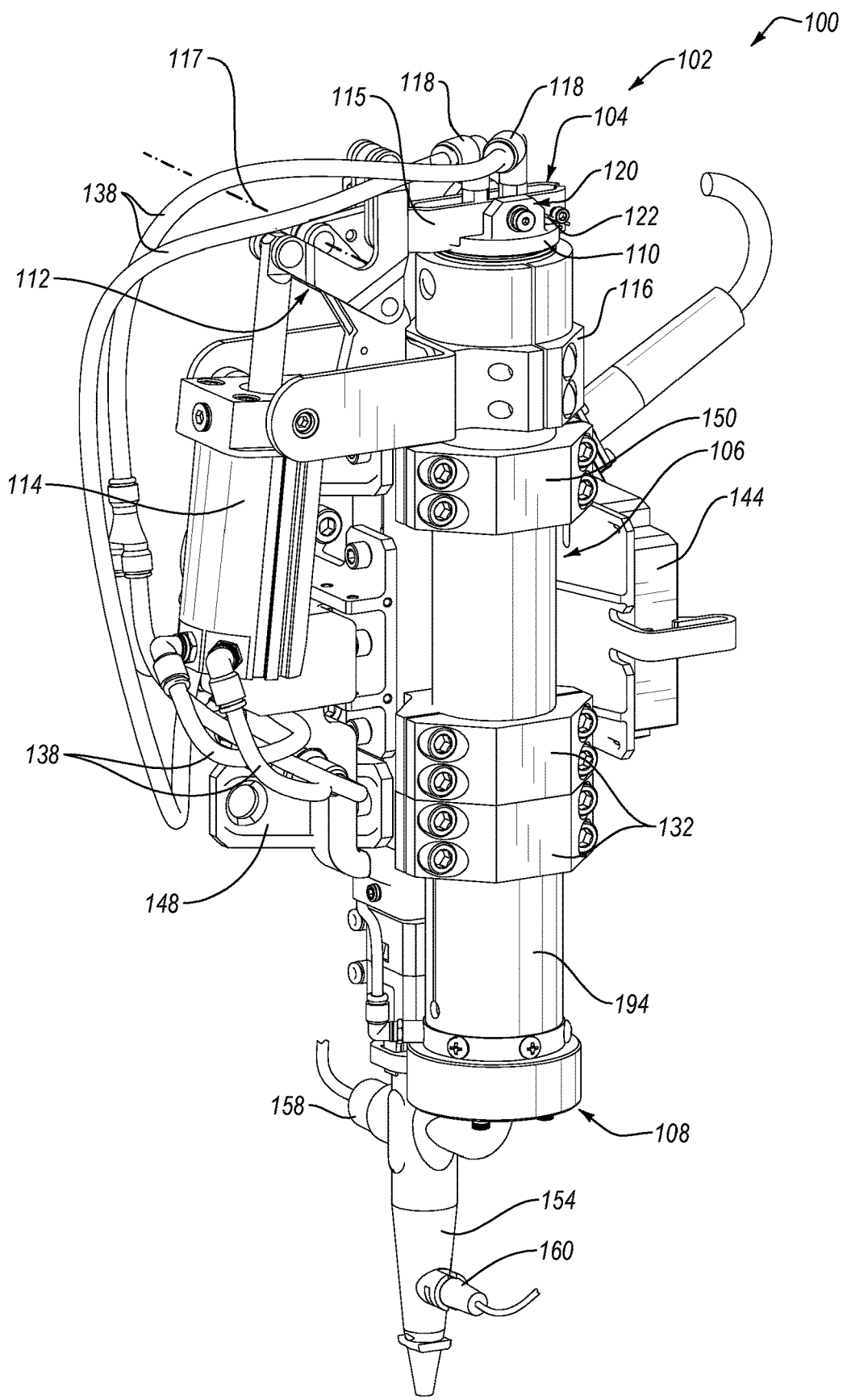
Figure 3:
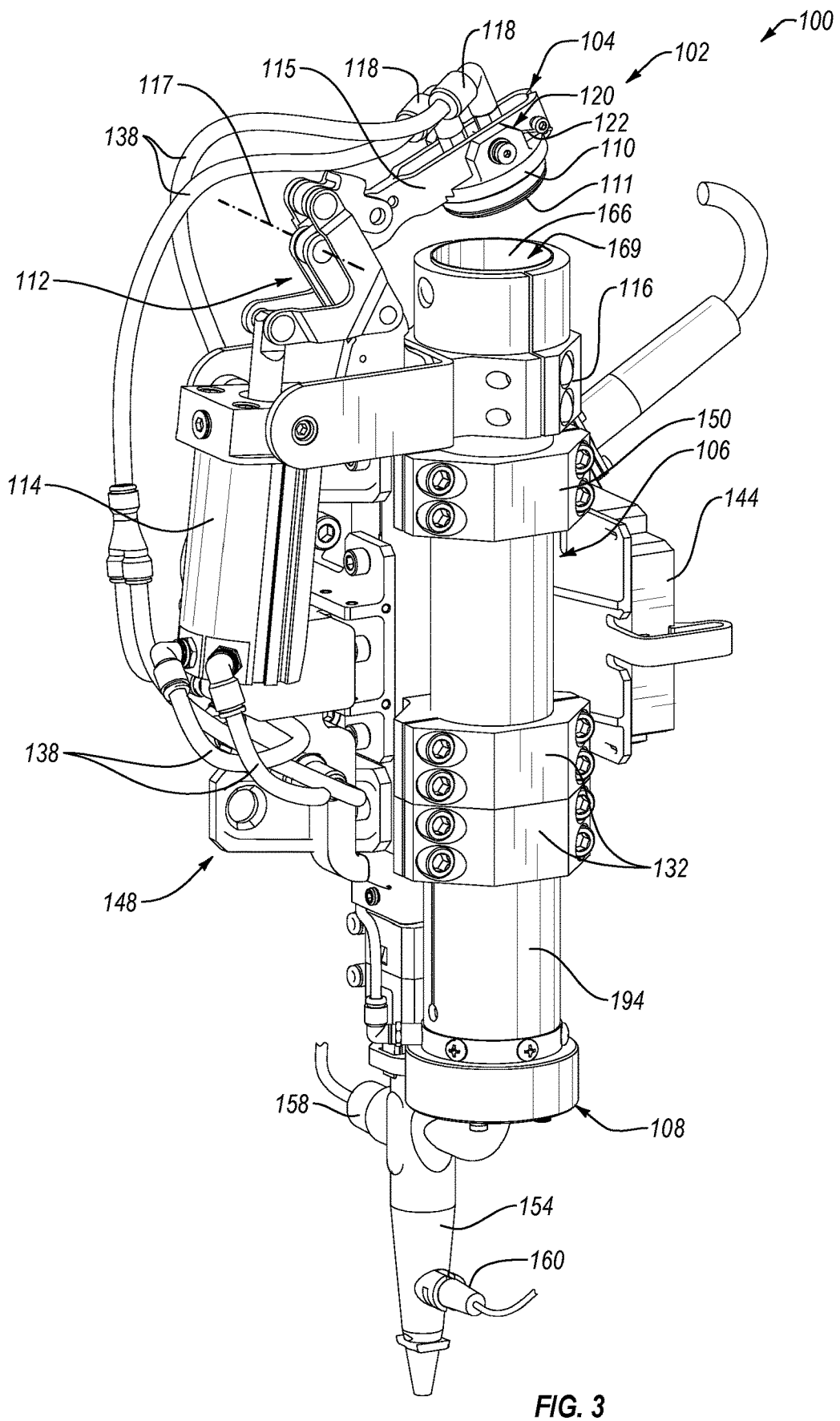
Figure 4:
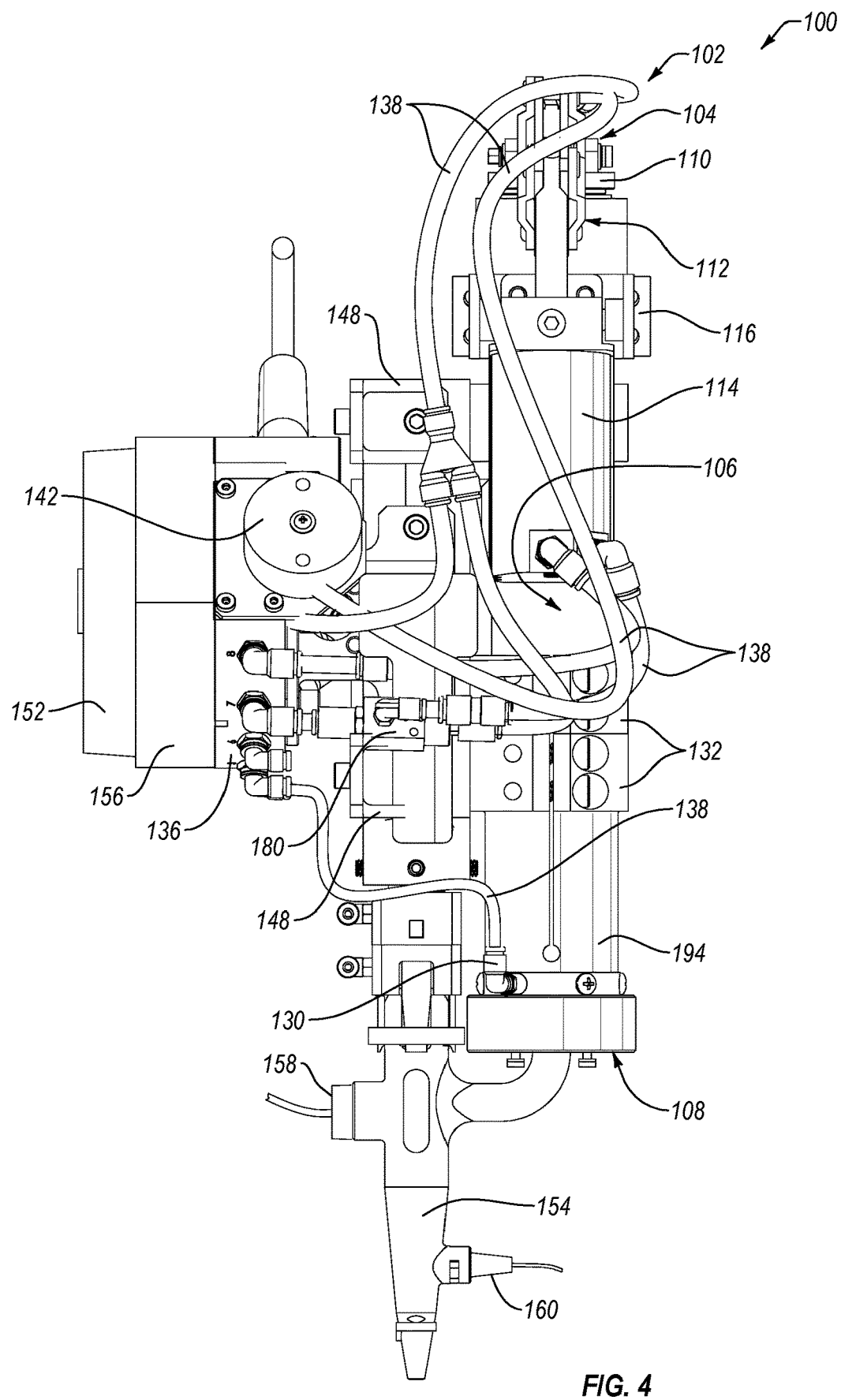
Figure 5:
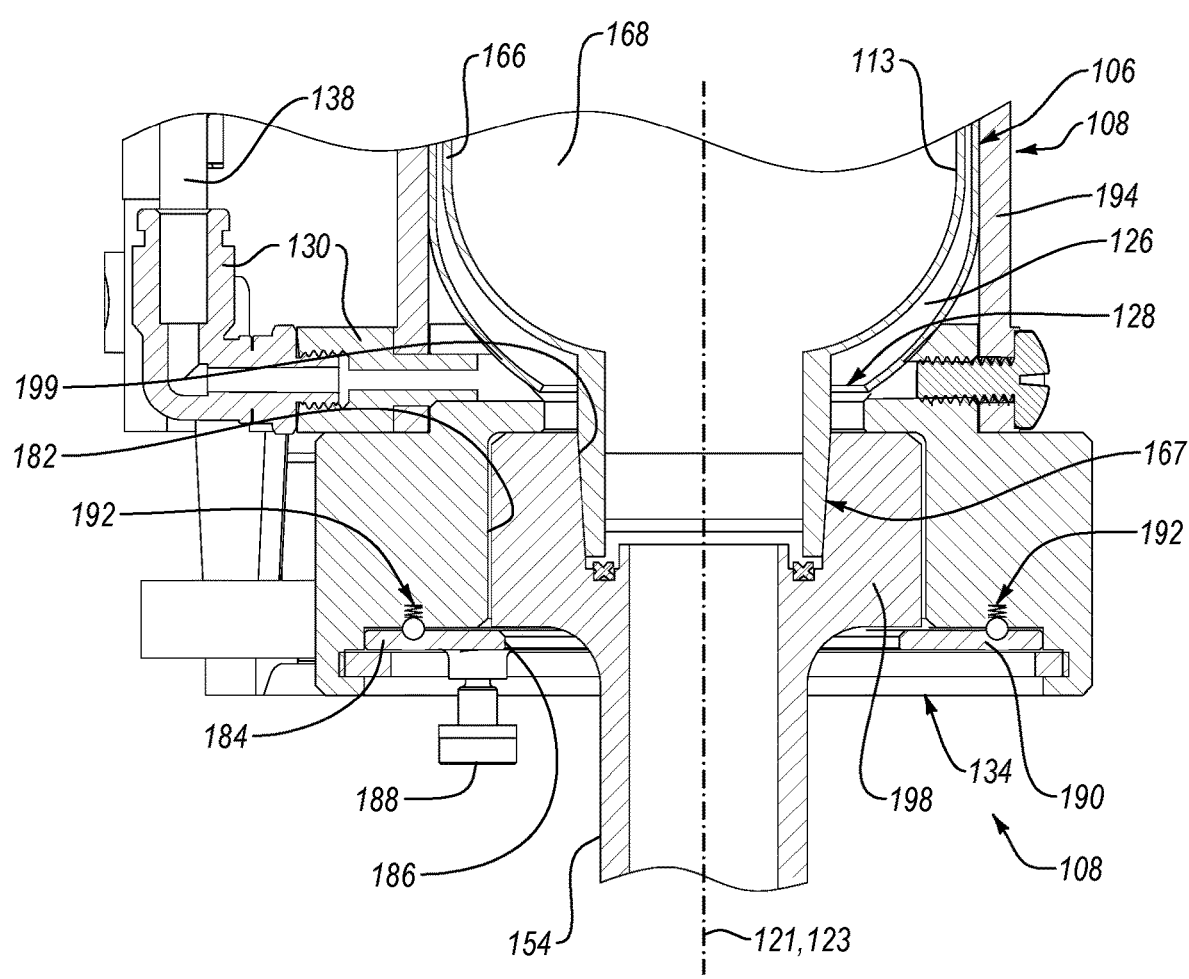
Figure 6:
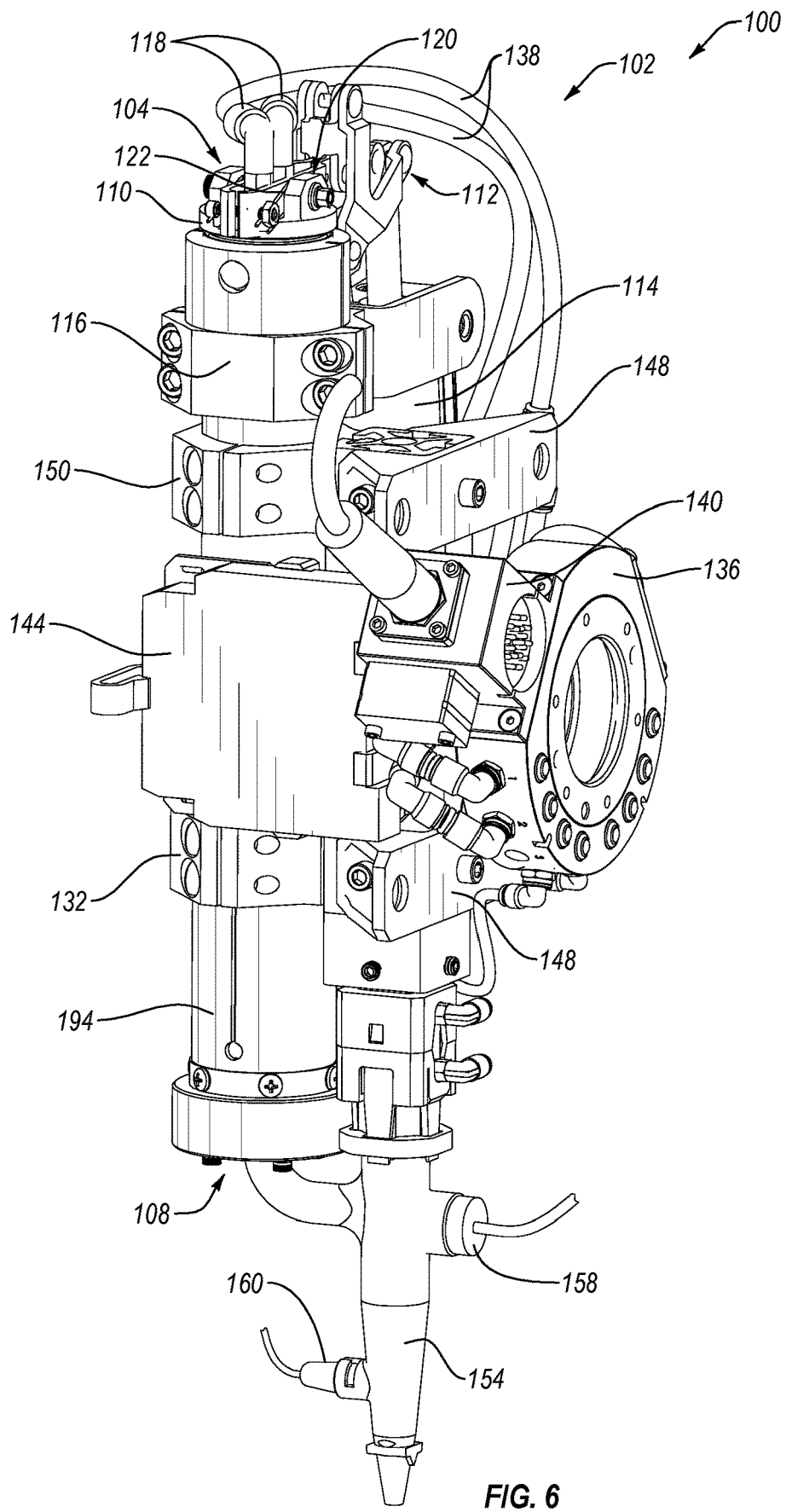
Figure 7:
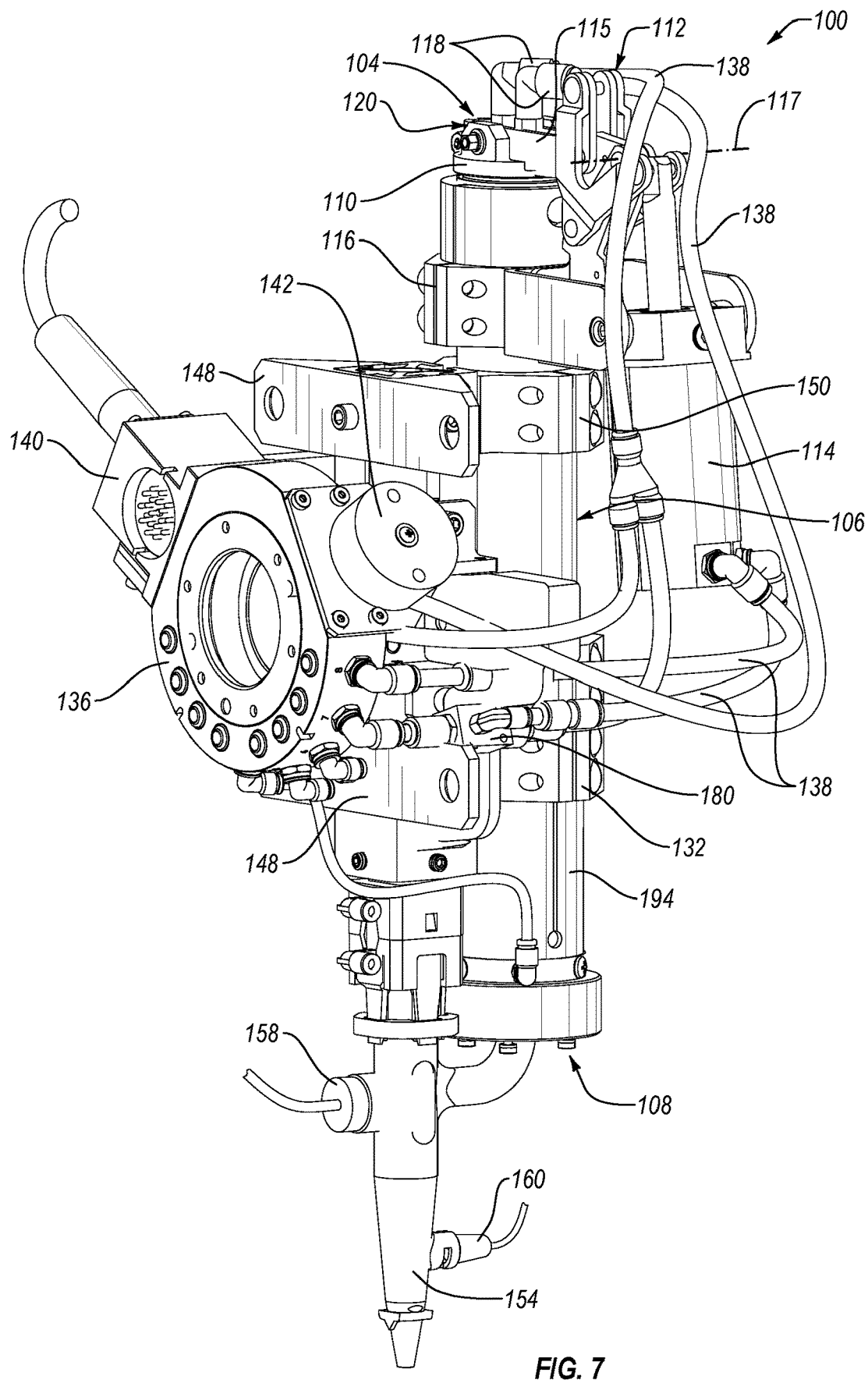
Figure 8:
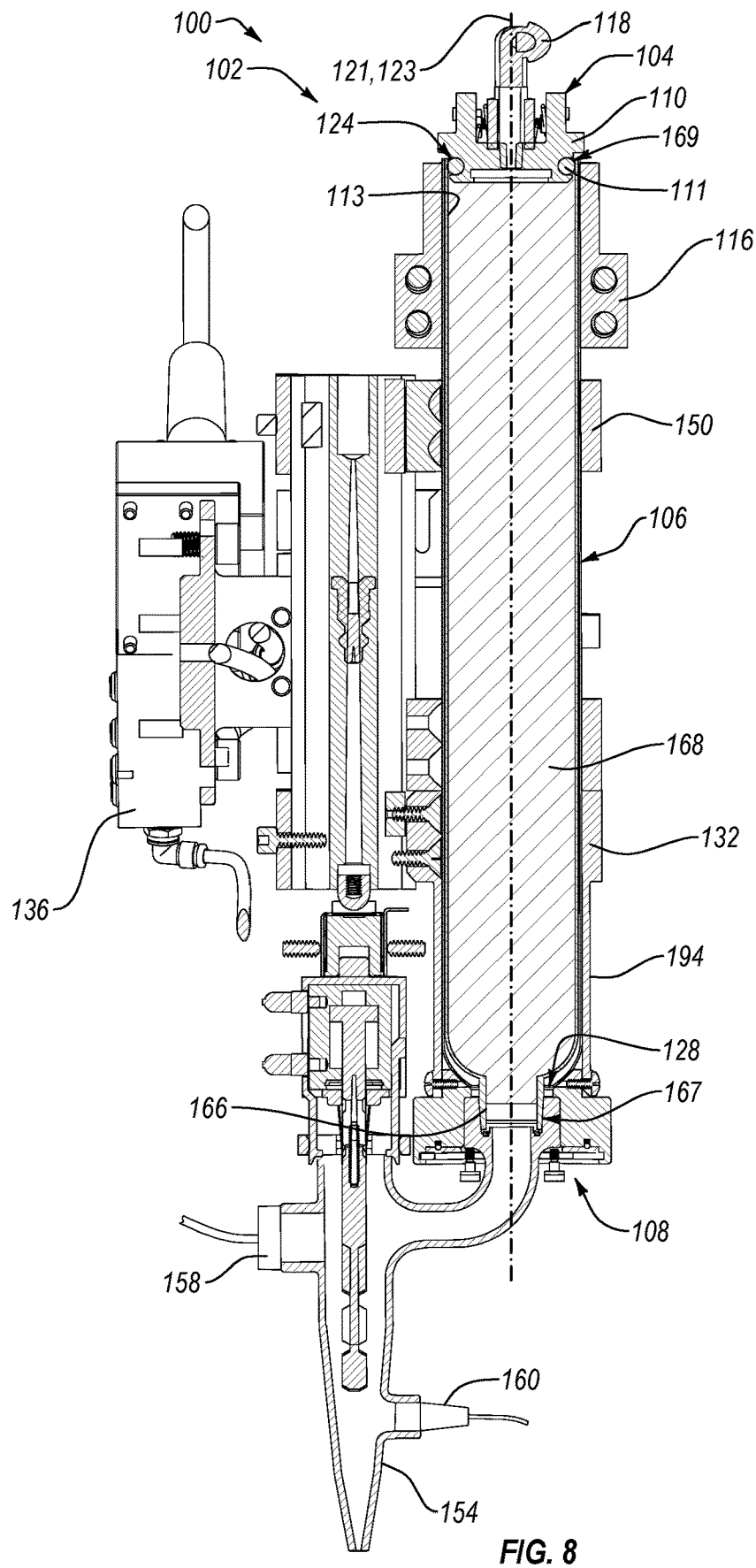
Figure 9:
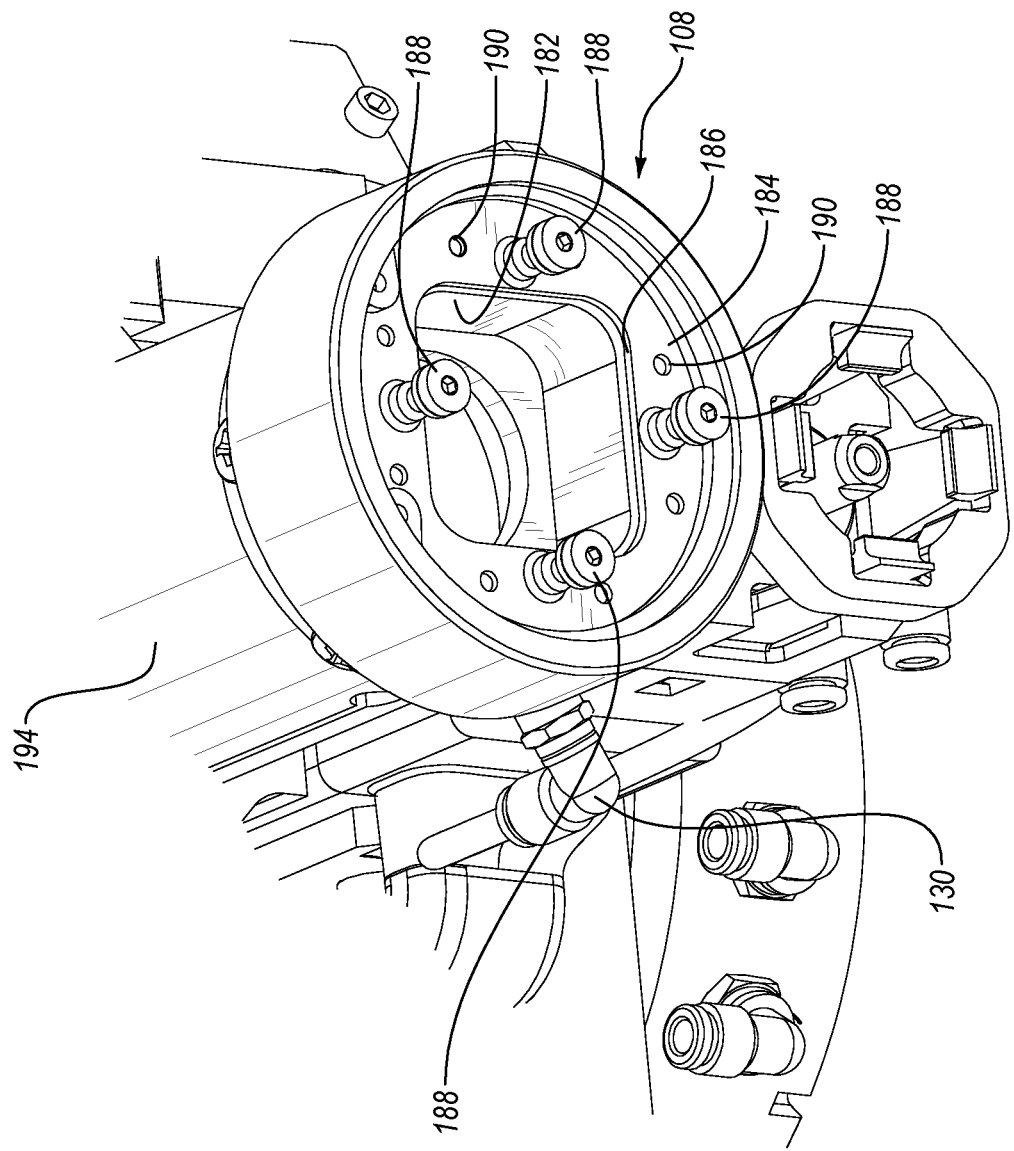
Figure 10:
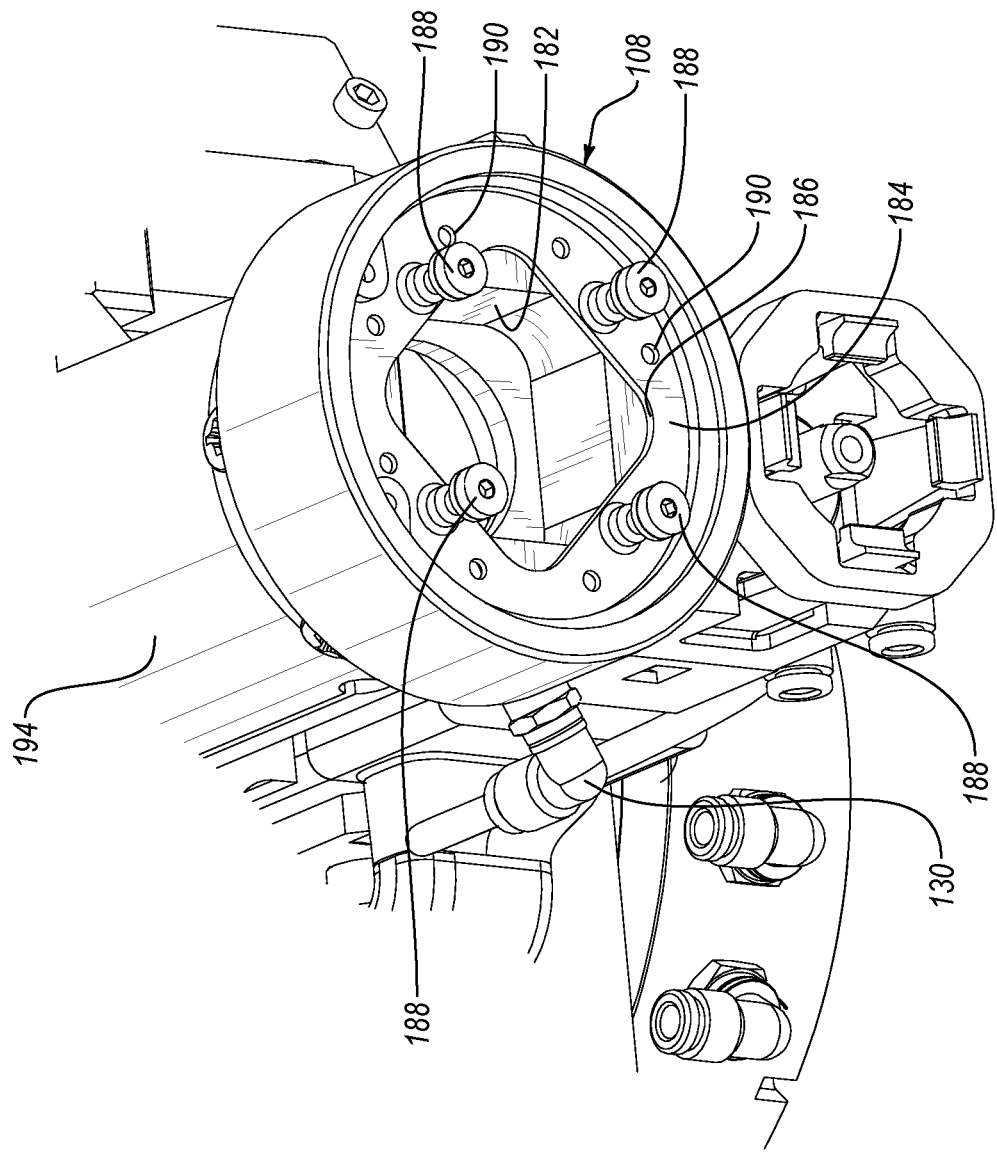
Figure 11B:
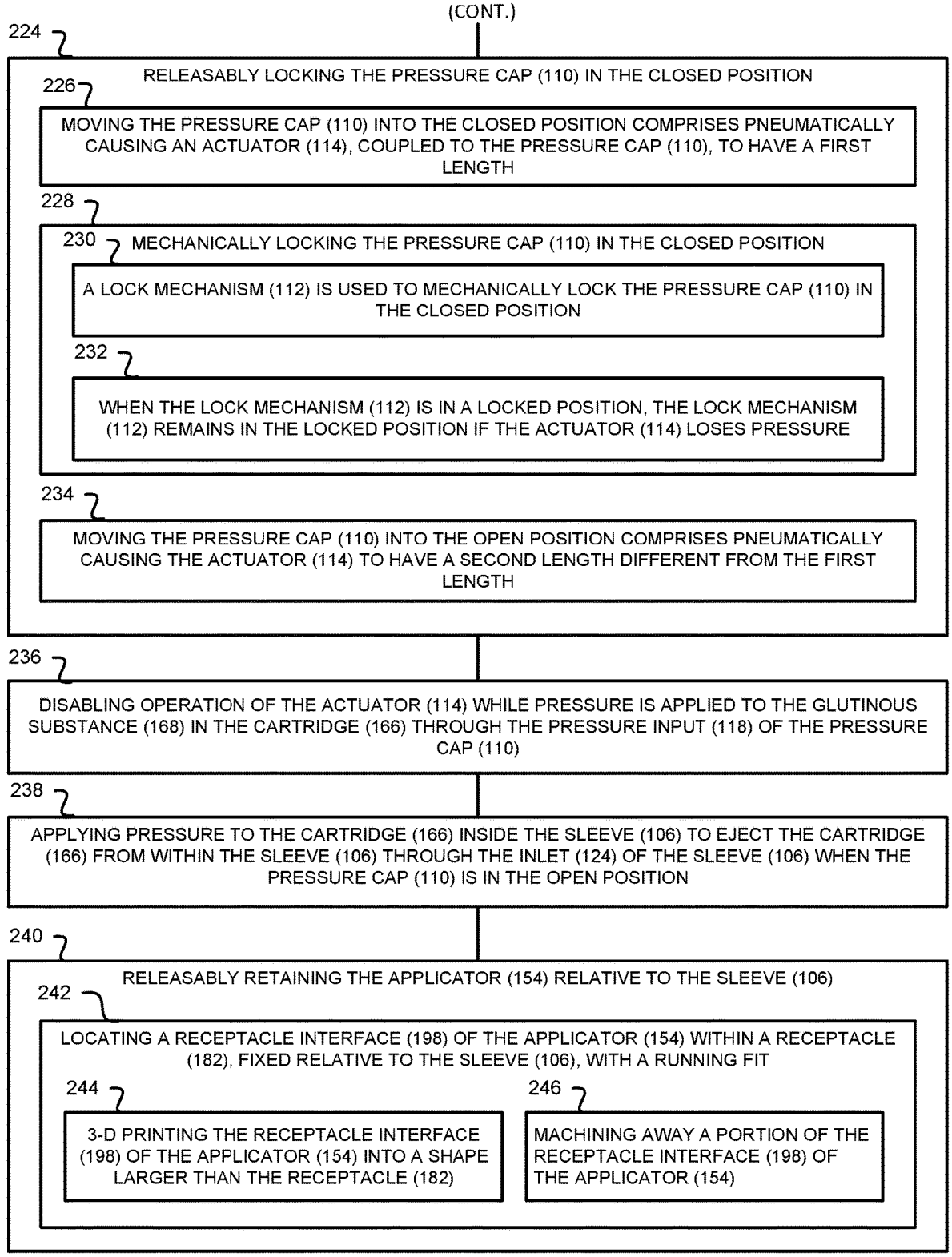
Figure 12:
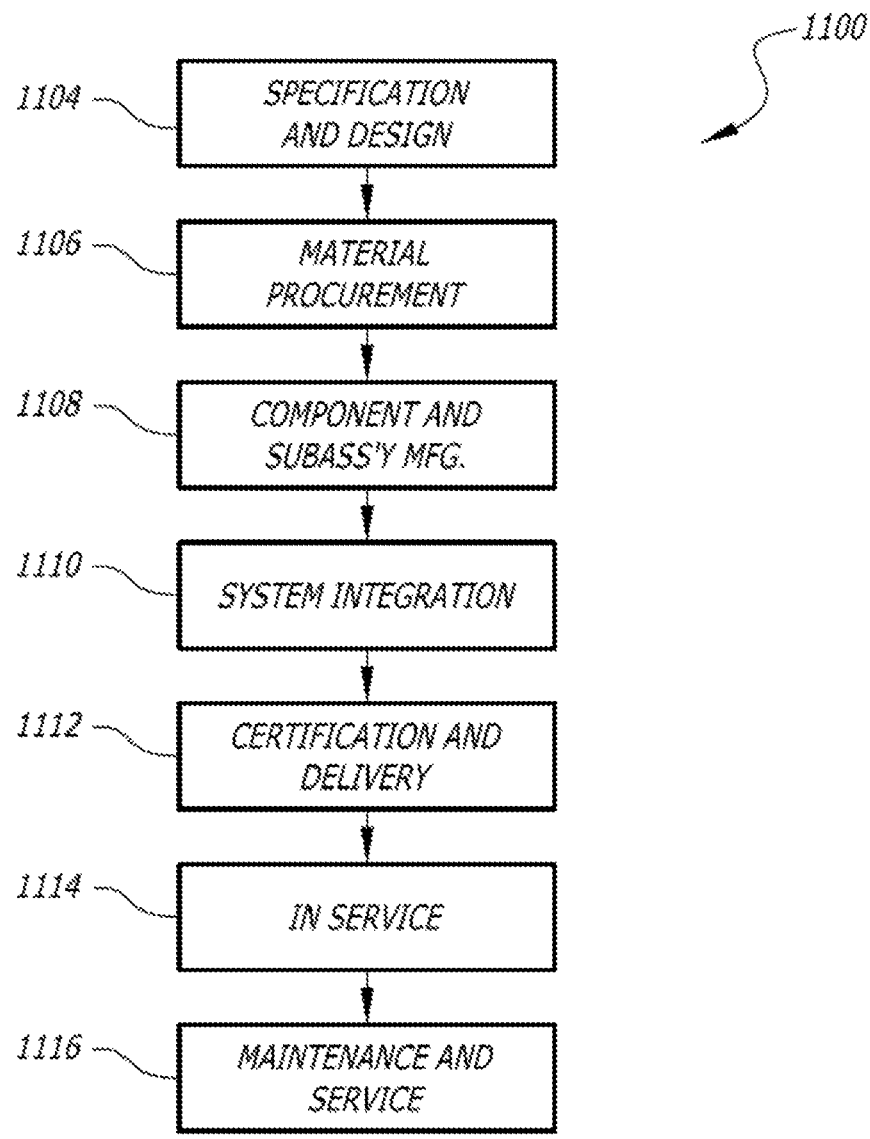
Figure 13:
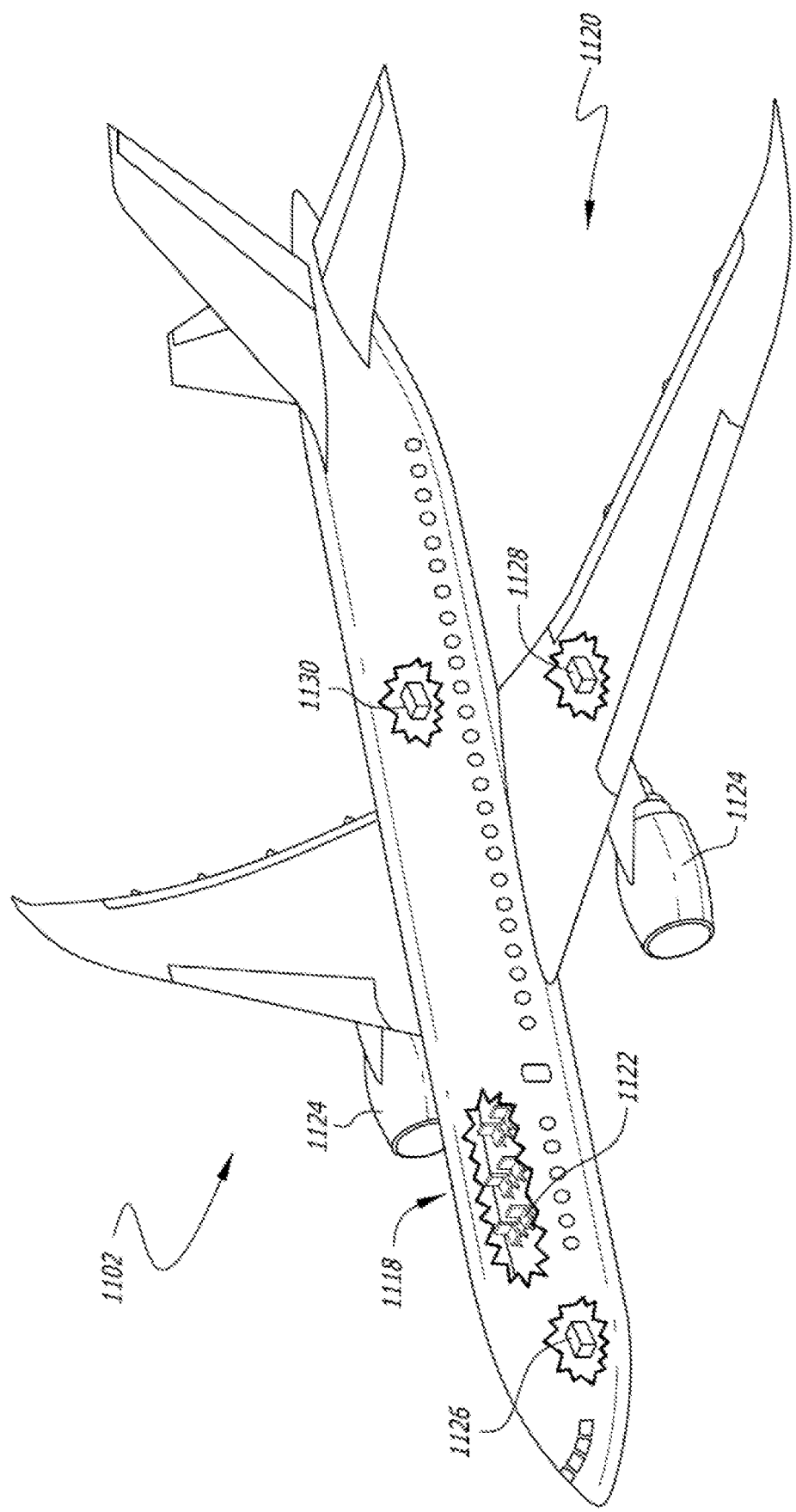

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a system for delivering a glutinous substance from a cartridge to a surface of a workpiece, wherein the system includes an apparatus for delivering the glutinous substance from the cartridge to an applicator, according to one or more examples of the present disclosure;

FIG. 2 is a schematic, perspective view of the apparatus of FIG. 1, according to one or more examples of the present disclosure;

FIG. 3 is a schematic, perspective view of the apparatus of FIG. 1, according to one or more examples of the present disclosure;

FIG. 4 is a schematic, side elevation view of the apparatus of FIG. 1, according to one or more examples of the present disclosure;

FIG. 5 is a schematic, cross-sectional side elevation view of a detail of the apparatus of FIG. 1, according to one or more examples of the present disclosure;

FIG. 6 is a schematic, perspective view of the apparatus of FIG. 1, according to one or more examples of the present disclosure;

FIG. 7 is a schematic, perspective view of the apparatus of FIG. 1, according to one or more examples of the present disclosure;

FIG. 8 is a schematic, cross-sectional side elevation view of the apparatus of FIG. 1, according to one or more examples of the present disclosure;

FIG. 9 is a schematic, perspective view of a detail of the apparatus of FIG. 1, according to one or more examples of the present disclosure;

FIG. 10 is a schematic, perspective view of a detail of the apparatus of FIG. 1, according to one or more examples of the present disclosure;

FIGS. 11A and 11B collectively are a block diagram of a method of utilizing the apparatus of FIG. 1, according to one or more examples of the present disclosure;

FIG. 12 is a block diagram of aircraft production and service methodology; and FIG. 13 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 11A, 11B, and 12, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11A, 11B, and 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2-10, apparatus 102 for delivering glutinous substance 168 from cartridge 166 to applicator 154 is disclosed. Apparatus 102 comprises sleeve 106, comprising central axis 121, inlet 124, and outlet 128 opposite inlet 124. Sleeve 106 is configured to receive cartridge 166 through inlet 124. Additionally, apparatus 102 comprises pressure-cap assembly 104, coupled to sleeve 106. Pressure-cap assembly 104 comprises pressure cap 110 proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124 of sleeve 106. Pressure cap 110 comprises pressure input 118, through which pressure is selectively applied to glutinous substance 168 in cartridge 166 when cartridge 166 is received within sleeve 106, pressure cap 110 is in closed position, and leading end 167 of cartridge 166 is in sealed engagement with applicator 154. Pressure-cap assembly 104 further comprises actuator 114, coupled to pressure cap 110 and to sleeve 106. Actuator 114 is selectively operable to move pressure cap 110 relative to sleeve 106 between, inclusively, the closed position and the open position. Apparatus 102 also comprises applicator interface 108, proximate outlet 128 of sleeve 106. Applicator interface 108 is configured to releasably retain applicator 154 so that applicator 154 is sealingly coupled with leading end 167 of cartridge 166 when pressure cap 110 is in the closed position. The preceding subject matter of this paragraph characterizes example 1 of the present disclosure.

Apparatus 102 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. Applicator interface 108 enables secure attachment of applicator 154 to apparatus 102 and quick release of applicator 154 from apparatus 102. With cartridge 166 received within sleeve 106 and pressure cap 110 in a closed position, cartridge 166 is sealed with applicator 154 to enable sealed flow of glutinous substance 168 from cartridge 166 to applicator 154 via the application of pressure to glutinous substance 168 in cartridge 166.

Apparatus 102 can include pressure tubes 138 to facilitate the communication of pressure to and from various components of apparatus 102. For example, pressure tubes 138 may communicate pressure to pressure inputs 118. As an example, pressure tubes 138 may communicate pressure to and from actuator 114 to facilitate selective operation of actuator 114. Also, pressure tubes 138 may communicate pressure to pressure input 130 to facilitate ejection of cartridge 166 from sleeve 106, such as after glutinous substance 168 has been emptied from cartridge 166.

In some examples, various components of apparatus 102 are fixed to sleeve 106 via clamps 116, 132, 150. For example, actuator 114 is fixed to sleeve 106 by clamp 116, applicator interface 108 is fixed to sleeve 106 by tube 194 secured about sleeve 106 by clamps 132, and brackets 148 are fixed to sleeve 106 by clamps 132, 150. According to other examples, the various components of apparatus 102 are fixed to sleeve 106 using other fixation techniques, such as fastening, adhering, co-forming, and the like.

Actuator 114 can be any of various actuators known in the art, such as linear actuators and rotary actuators, powered in any of various ways, such as pneumatically, electromagnetically, electrically, hydraulically, and the like. Pressure input 118 can be a pneumatic fitting in some examples. As used herein, a central axis of an object is a longitudinal symmetry axis of the object.

Referring generally to FIG. 1 and particularly to, e.g., FIGS. 2-4 and 6-8, pressure, selectively applied to glutinous substance 168 in cartridge 166 through pressure input 118 of pressure cap 110, is pneumatic pressure. The preceding subject matter of this paragraph characterizes example 2 of the present disclosure, wherein example 2 also includes the subject matter according to example 1, above.

Selective pneumatic operation of pressure input 118 of pressure cap 110 enables precise application of pneumatic pressure to glutinous substance 168 in cartridge 166 to precisely control the flow of glutinous substance 168 out of cartridge 166 and into applicator 154. Moreover, selective pneumatic operation of pressure input 118 of pressure cap 110 facilitates the use of automated pneumatic controls to control the pneumatic operation of pressure input 118 of pressure cap 110.

Referring generally to FIG. 1 and particularly to, e.g., FIGS. 3 and 8, pressure cap 110 further comprises gasket 111. Gasket 111 is configured to form a seal between pressure cap 110 and interior surface 113 of cartridge 166 when pressure cap 110 is in the closed position and applicator 154 is retained by applicator interface 108. The preceding subject matter of this paragraph characterizes example 3 of the present disclosure, wherein example 3 also includes the subject matter according to any one of examples 1 or 2, above.

Gasket 111, by forming seal between pressure cap 110 and interior surface 113 of cartridge 166, facilitates the containment of pressure from pressure input 118 of pressure cap 110 to within cartridge 166.

Gasket 111 can be an o-ring made from a pliable or compressible material, such as rubber, silicone, and plastic polymers.

Referring generally to FIG. 1 and particularly to, e.g., FIGS. 2, 3, and 7, pressure-cap assembly 104 further comprises arm 115. Arm 115 is pivotable about axis 117 that is fixed relative to sleeve 106 and is perpendicular to central axis 121 of sleeve 106. Pressure cap 110 is coupled with arm 115. The preceding subject matter of this paragraph characterizes example 4 of the present disclosure, wherein example 4 also includes the subject matter according to any one of examples 1-3, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to FIG. 1 and particularly to, e.g., FIGS. 2-4 and 7, pressure-cap assembly 104 further comprises lock mechanism 112, mechanically coupling arm 115 with actuator 114. Furthermore, lock mechanism 112 is configured to releasably lock pressure cap 110 in the closed position by releasably locking arm 115 relative to sleeve 106. The preceding subject matter of this paragraph characterizes example 5 of the present disclosure, wherein example 5 also includes the subject matter according to example 4, above.

Using lock mechanism 112 to releasably lock pressure cap 110 in the closed position by releasably locking arm 115 relative to sleeve 106 prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to FIG. 1 and particularly to, e.g., FIGS. 2-4 and 7, actuator 114 is selectively operable to move lock mechanism 112 between, inclusively, a locked position, in which arm 115 is releasably locked relative to sleeve 106 so pressure cap 110 is releasably locked in the closed position, and an unlocked position, in which arm 115 is arranged relative to sleeve 106 so that pressure cap 110 is in the open position. The preceding subject matter of this paragraph characterizes example 6 of the present disclosure, wherein example 6 also includes the subject matter according to example 5, above.

Actuator 114 is configured to enable lock mechanism 112 to unlock pressure cap 110 and allow pressure cap 110 to move out of the closed position by moving lock mechanism 112 relative to arm 115, via selective operation of actuator 114, while pressure cap 110 is sealingly engaged with cartridge 166. In other words, lock mechanism 112 in the locked position will lock pressure cap 110 in the closed position until actuator 114 moves lock mechanism 112 relative to pressure cap 110 to unlock lock mechanism 112 and move pressure cap 110 into the open position.

Referring generally to FIG. 1 and particularly to, e.g., FIGS. 2-4 and 7, actuator 114 is pneumatically operable. When lock mechanism 112 is in the locked position, lock mechanism 112 remains in the locked position if actuator 114 loses pressure. The preceding subject matter of this paragraph characterizes example 7 of the present disclosure, wherein example 7 also includes the subject matter according to example 6, above.

In the event actuator 114 loses pressure, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to FIG. 1 and particularly to, e.g., FIGS. 2-4 and 7, lock mechanism 112 comprises an over-center linkage. The preceding subject matter of this paragraph characterizes example 8 of the present disclosure, wherein example 8 also includes the subject matter according to any one of examples 5-7, above.

The over-center linkage of lock mechanism 112 enables quick, easy, and effective locking and unlocking of the lock mechanism.

The over-center linkage can be a passive lock mechanism that is simply constructed, yet effective at preventing back-driving. For example, the over-center linkage includes first and second linkages each independently pivotable about the same first axis. The first linkage is pivotally fixed to arm 115 and pivots about a second axis. The second linkage is pivotally fixed relative to sleeve 106 and pivots about a third axis. As arm 115 rotates to move pressure cap 110 toward closed position, the first linkage rotates about the first axis in a first rotational direction and the second linkage rotates about the first axis in a second rotational direction opposite the first rotational direction until the first, second, and third axes are aligned, which positions the over-center linkage in an over-center position. Further rotation of arm 115 to move pressure cap 110 into the closed position results in the over-center linkage moving beyond the over-center position, which locks arm 115 and prevents arm 115 from rotating pressure cap 110 toward the open position. The over-center linkage is unlocked to allow the arm 115 to rotate pressure cap 110 toward the open position by concurrently pivoting, via actuator 114, the first linkage about the first axis in the second rotational direction and pivoting the second linkage about the first axis in the first rotational direction until the over-center linkage moves into and beyond the over-center position.

Referring generally to FIG. 1 and particularly to, e.g., FIGS. 2, 3, and 6, pressure cap 110 is pivotable relative to arm 115. Pressure-cap assembly 104 further comprises biasing element 122, configured to torsionally bias pressure cap 110 relative to arm 115. The preceding subject matter of this paragraph characterizes example 9 of the present disclosure, wherein example 9 also includes the subject matter according to any one of examples 4-8, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166. As used herein, to "torsionally bias" means to continuously apply a moment, which may or may not have a constant magnitude, but is always applied in the same direction and has a magnitude greater than zero.

Referring generally to FIG. 1 and particularly to, e.g., FIGS. 2, 3, and 6, biasing element 122 comprises a torsion spring. The preceding subject matter of this paragraph characterizes example 10 of the present disclosure, wherein example 10 also includes the subject matter according to example 9, above.

A torsion spring facilitates a passive and simple way to torsionally bias pressure cap 110 relative to arm 115.

The torsion spring can be coupled at one end to arm 115 and at another end to pressure cap 110. In some examples, the torsion spring includes a coiled or twisted torsion bar that biases one end of the torsion spring relative to the other end of the torsion spring.

Referring generally to FIG. 1 and particularly to, e.g., FIGS. 4, 5, 9, and 10, apparatus 102 further comprises pressure input 130 proximate outlet 128 of sleeve 106. Pressure is selectively applied through pressure input 130 to cartridge 166 to eject cartridge 166 from sleeve 106 through inlet 124 of sleeve 106. The preceding subject matter of this paragraph characterizes example 11 of the present disclosure, wherein example 11 also includes the subject matter according to any one of examples 1-10, above.

Selective operation of pressure input 130 facilitates the removal of cartridge 166 from sleeve 106, such as after glutinous substance 168 has been emptied from cartridge 166. In some examples, when cartridge 166 is received within sleeve 106, because only a small portion of cartridge 166 may be accessible for gripping from outside sleeve 106 or because cartridge 166 may become at least partially stuck within sleeve 106, it may be difficult to remove cartridge 166 from sleeve 106. Pressure input 130 facilitates ease of removal of cartridge 166 from sleeve 106 by increasing pressure within sleeve 106 proximate outlet 128 of sleeve 106, which urges movement of cartridge 166 through sleeve 106 towards and out of inlet 124 of sleeve 106.

Pressure input 130 can be a pneumatic fitting in some examples. Moreover, pressure can be communicated to pressure input 130 through pressure tube 138.

Referring generally to FIG. 1 and particularly to, e.g., FIGS. 4, 5, 9, and 10, pressure input 130 communicates pressure into sleeve 106 through outlet 128 of sleeve 106. The preceding subject matter of this paragraph characterizes example 12 of the present disclosure, wherein example 12 also includes the subject matter according to example 11, above.

Pressure input 130 communicates pressure into sleeve 106 through outlet 128 of sleeve 106 to increase pressure within sleeve 106 between sleeve 106 proximate outlet 128 of sleeve 106 and cartridge 166, which urges movement of cartridge 166 through sleeve 106 towards and out of inlet 124 of sleeve 106.

Referring generally to FIG. 1 and particularly to, e.g., FIGS. 4, 5, 9, and 10, pressure, selectively applied to cartridge 166 through pressure input 130, is pneumatic pressure. The preceding subject matter of this paragraph characterizes example 13 of the present disclosure, wherein example 13 also includes the subject matter according to example 12, above.

Selective pneumatic operation of pressure input 130 enables precise application of pneumatic pressure into sleeve 106 through outlet 128 of sleeve 106 to precisely control the timing and rate at which cartridge 166 is ejected from sleeve 106 through inlet 124 of sleeve 106. Moreover, selective pneumatic operation of pressure input 130 facilitates the use of automated pneumatic controls to control the pneumatic operation of pressure input 130.

Referring generally to FIG. 1 and particularly to, e.g., FIGS. 4 and 7, apparatus 102 further comprises control valve 180 that is pneumatically coupled to pressure input 118 of pressure cap 110 and to actuator 114. Control valve 180 is configured to disable operation of actuator 114 by preventing pressure from being communicated to actuator 114 when, with pressure cap 110 in the closed position, pressure is applied to glutinous substance 168 in cartridge 166 through pressure input 118. The preceding subject matter of this paragraph characterizes example 14 of the present disclosure, wherein example 14 also includes the subject matter according to any one of examples 1-13, above.

Control valve 180 prevents actuator 114 from inadvertently opening pressure cap 110 while pressure is being applied to glutinous substance 168 in cartridge 166 through pressure input 118. Preventing pressure cap 110 from opening while pressure is being applied to glutinous substance 168 due to inadvertent actuation of actuator 114 ensures pressure within cartridge 166 is not inadvertently released.

In some examples, control valve 180 is a two-way, normally open, air-piloted valve manufactured by Clippard Instrument Laboratory, Inc. of Cincinnati, Ohio.

Referring generally to FIG. 1 and particularly to, e.g., FIGS. 2-4 and 6-8, apparatus 102 further comprises pressure sensor 158, configured to be coupled to applicator 154. The preceding subject matter of this paragraph characterizes example 15 of the present disclosure, wherein example 15 also includes the subject matter according to any one of examples 1-14, above.

Pressure sensor 158 enables detection of the pressure of glutinous substance 168 in applicator 154. The pressure of glutinous substance 168 in applicator 154 detected by pressure sensor 158 can be used to control the rate at which glutinous substance 168 flows from cartridge 166 to applicator 154. Further, pressure sensor 158 being configured to be coupled to applicator 154 allows pressure sensor 158 to remain part of apparatus 102 while being decoupleable from applicator 154 to remove applicator 154 from apparatus 102 or being coupleable to applicator 154 after applicator 154 is coupled to apparatus 102.

Referring generally to FIG. 1 and particularly to, e.g., FIGS. 2, 3, and 6, apparatus 102 further comprises pressure-signal conditioner 144, electrically coupled to pressure sensor 158. The preceding subject matter of this paragraph characterizes example 16 of the present disclosure, wherein example 16 also includes the subject matter according to example 15, above.

Pressure-signal conditioner 144 enables communication of pressure-related information from pressure sensor 158 to controller 157 in a format useable by controller 157. Accordingly, pressure-signal conditioner 144 provides data format conversion functionality on-board apparatus 102, rather than at controller 157.

Referring generally to FIG. 1 and particularly to, e.g., FIGS. 2-4 and 6-8, apparatus 102 further comprises temperature sensor 160, configured to be coupled to applicator 154. The preceding subject matter of this paragraph characterizes example 17 of the present disclosure, wherein example 17 also includes the subject matter according to any one of examples 1-16, above.

Temperature sensor 160 enables detection of the temperature of glutinous substance 168 in applicator 154. The temperature of glutinous substance 168 in applicator 154 detected by temperature sensor 160 can be used to control the rate at which glutinous substance 168 flows from cartridge 166 to applicator 154. Further, temperature sensor 160 being configured to be coupled to applicator 154 allows temperature sensor 160 to remain part of apparatus 102 while being decoupleable from applicator 154 to remove applicator 154 from apparatus 102 or being coupleable to applicator 154 after applicator 154 is coupled to apparatus 102.

Referring generally to FIG. 1 and particularly to, e.g., FIGS. 4 and 7, apparatus 102 further comprises temperature-signal conditioner 142, electrically coupled to temperature sensor 160. The preceding subject matter of this paragraph characterizes example 18 of the present disclosure, wherein example 18 also includes the subject matter according to example 17, above.

Temperature-signal conditioner 142 enables communication of temperature-related information from temperature sensor 160 to controller 157 in a format useable by controller 157. Accordingly, temperature-signal conditioner 142 provides data format conversion functionality on-board apparatus 102, rather than at controller 157.

Referring generally to FIG. 1 and particularly to, e.g., FIGS. 5 and 8-10, applicator interface 108 comprises receptacle 182 that is cross-sectionally complementary to receptacle interface 198 of applicator 154. Applicator interface 108 further comprises retainer 184, rotatable relative to receptacle 182. The preceding subject matter of this paragraph characterizes example 19 of the present disclosure, wherein example 19 also includes the subject matter according to any one of examples 1-18, above.

Receptacle 182 of applicator interface 108 being cross-sectionally complementary to receptacle interface 198 of applicator 154, along with retainer 184, ensures applicator 154 is securely coupled to applicator interface 108 by providing a relatively tight fit between receptacle 182 of applicator interface 108 and receptacle interface 198 of applicator 154.

In some examples, the shapes of receptacle 182 of applicator interface 108 and receptacle interface 198 of applicator 154 are non-round (e.g., rectangular) such that, when receptacle interface 198 is received within receptacle 182, rotation of applicator 154 relative to applicator interface 108 is prevented. According to yet some examples, receptacle interface 198 of applicator 154 is nestably engageable with receptacle 182 of applicator interface 108.

Referring generally to FIG. 1 and particularly to, e.g., FIGS. 5 and 8-10, retainer 184 comprises aperture 186. Aperture 186 is configured so that receptacle interface 198 of applicator 154 is retained inside applicator interface 108 when retainer 184 is in at least one retaining orientation relative to receptacle 182. Aperture 186 is also configured so that receptacle interface 198 of applicator 154 is removable from applicator interface 108 when retainer 184 is in at least one releasing orientation relative to receptacle 182. The preceding subject matter of this paragraph characterizes example 20 of the present disclosure, wherein example 20 also includes the subject matter according to example 19, above.

Use of retainer 184 allows for quick and easy secure coupling of applicator 154 to applicator interface 108 and decoupling of applicator 154 from applicator interface 108. Retainer 184 can be reoriented between the at least one retaining orientation and the at least one releasing orientation to allow for secure coupling of applicator 154 to applicator interface 108 and decoupling of applicator 154 from applicator interface 108. In one example, retainer 184 is a disk-like element that is rotatable to orient retainer 184 between the at least one retainer orientation and the at least one releasing orientation.

Referring generally to FIG. 1 and particularly to, e.g., FIGS. 5 and 8-10, aperture 186 of retainer 184 has a shape identical to that of a cross-section of receptacle 182. The cross-section of receptacle 182 is perpendicular to central axis 121 of sleeve 106. The preceding subject matter of this paragraph characterizes example 21 of the present disclosure, wherein example 21 also includes the subject matter according to example 20, above.

Aperture 186 of retainer 184 having an identical shape as the cross-section of receptacle 182, enables receptacle interface 198 of applicator 154 to be inserted through aperture 186 of retainer 184 into receptacle 182, or removed through aperture 186 of retainer 184 from receptacle 182, when retainer 184 is in the at least one releasing orientation, and enables receptacle interface 198 of applicator 154 to be retained within receptacle 182 when retainer 184 is oriented into the at least one retaining orientation. More specifically, because aperture 186 of retainer 184 has a shape identical to that of a cross-section of receptacle 182, when in the at least one releasing orientation, no portion of retainer 184 covers receptacle 182 to allow insertion and removal of receptacle interface 198 into and out of receptacle 182, and when in the at least one retaining orientation, some portion of retainer 184 covers receptacle 182 to retain receptacle interface 198 within receptacle 182.

Referring generally to, e.g., FIG. 1 and particularly to FIGS. 5, 9, and 10, retainer 184 comprises at least one grip element 188, extending from retainer 184. The preceding subject matter of this paragraph characterizes example 22 of the present disclosure, wherein example 22 also includes the subject matter according to any one of examples 19-21, above.

At least one grip element 188 facilitates the manual gripping of retainer 184 for rotating retainer 184. In other words, at least one grip element 188 can be easily gripped (e.g., pinched or received) by a user to manually rotate retainer 184.

In some examples, at least one grip element 188 can be any of various protrusions, such as posts, knobs, bars, spikes, projections, and the like, extending from retainer 184. According to yet other examples, at least one grip element 188 can be any of various depressions in retainer 184 with which a user may engage. At least one grip element 188 may include surface features or materials configured to enhance a user's grip of at least one grip element 188.

Referring generally to, e.g., FIG. 1 and particularly to FIGS. 5, 9, and 10, applicator interface 108 comprises plurality of detents 192, configured to provide the at least one retaining orientation of retainer 184 relative to receptacle 182 and at least one releasing orientation of retainer 184 relative to receptacle 182. Each of plurality of detents 192 is configured to selectively releasably fix retainer 184 relative to receptacle 182 in one of the at least one retaining orientation or the at least one releasing orientation relative to receptacle 182. The preceding subject matter of this paragraph characterizes example 23 of the present disclosure, wherein example 23 also includes the subject matter according to any of the examples 19-22, above.

Plurality of detents 192 enable retainer 184 to be fixed in one orientation, selectively released from that orientation, and fixed in another orientation. Accordingly, plurality of detents 192 facilitate selectively orienting retainer 184 between multiple orientations and releasably fixing retainer 184 in a respective one of the multiple orientations. In this manner, a user can quickly and easily switch the orientation of retainer 184 between multiple orientations while ensuring retainer 184 will be releasably fixed in a selected orientation.

In some examples, each of plurality of detents 192 includes a projection (e.g., ball or pin) biased, via a biasing element (e.g., spring), into engagement with one of multiple apertures 190 formed in retainer 184. The position of each aperture 190 on retainer 184 ensures that engagement of the projection of one of plurality of detents 192 with one of aperture 190 orients retainer 184 in one of the at least one releasing orientation or one of the at least one retaining orientation. For example, the position of apertures 190 on retainer 184 ensures that engagement of the projection of one of plurality of detents 192 with one aperture 190 orients retainer 184 in one of the at least one releasing orientation or one of the at least one retaining orientation, and engagement of the projection of the one of plurality of detents 192 with an adjacent aperture 190 orients retainer 184 in the other of the at least one releasing orientation or one of the at least one retaining orientation. Plurality of detents 192 release retainer 184 when bias of biasing element is overcome via application of rotational pressure to retainer 184 by a user.

Referring generally to, e.g., FIG. 1 and particularly to FIGS. 9 and 10, the at least one retaining orientation of retainer 184 relative to receptacle 182 is at least four retaining orientations and the at least one releasing orientation of retainer 184 relative to receptacle 182 is at least four releasing orientations. The preceding subject matter of this paragraph characterizes example 24 of the present disclosure, wherein example 24 also includes the subject matter according to example 23, above.

The at least four retaining orientations of retainer 184 relative to receptacle 182 and the at least four releasing orientations of retainer 184 relative to receptacle 182 enable flexibility when rotating retainer 184 to switch between a releasing orientation and a retaining orientation.

Referring generally to, e.g., FIG. 1 and particularly to FIGS. 9 and 10, the at least one retaining orientation of retainer 184 relative to receptacle 182 is at least six retaining orientations and the at least one releasing orientation of retainer 184 relative to receptacle 182 is at least six releasing orientations. The preceding subject matter of this paragraph characterizes example 25 of the present disclosure, wherein example 25 also includes the subject matter according to example 23, above.

The at least six retaining orientations of retainer 184 relative to receptacle 182 and the at least six releasing orientations of retainer 184 relative to receptacle 182 enable even more flexibility when rotating retainer 184 to switch between a releasing orientation and a retaining orientation.

Referring generally to, e.g., FIG. 1 and particularly to FIGS. 4 and 6-8, apparatus 102 further comprises robot interface 136, coupled with sleeve 106 and configured to be releasably coupled to robot 152. The preceding subject matter of this paragraph characterizes example 26 of the present disclosure, wherein example 26 also includes the subject matter according to any one of examples 1-25, above.

Robot interface 136 promotes quick coupling of apparatus 102 with robot 152 and quick releasing of apparatus 102 from robot 152. Additionally, robot interface 136 facilitates quick coupling of communication lines between apparatus 102 and robot 152. For example, robot interface 136 may enable automated coupling of apparatus 102 with robot 152 and automated releasing of apparatus 102 from robot 152.

In some examples, robot interface 136 can be a tool-side portion of a pneumatic quick-change mechanism and robot 152 can include tool interface 156 of the pneumatic quick-change mechanism.

Referring generally to, e.g., FIG. 1 and particularly to FIGS. 2-4 and 6-8, apparatus 102 further comprises brackets 148, coupled with sleeve 106. Brackets 148 are configured to engage tool stand 196. The preceding subject matter of this paragraph characterizes example 27 of the present disclosure, wherein example 27 also includes the subject matter according to any one of examples 1-26, above.

Brackets 148 facilitate engagement with tool stand 196 for storing apparatus 102 when not in use.

According to some examples, brackets include apertures that receive respective engagement features of tool stand 196.

Referring generally to, e.g., FIG. 1 and particularly to FIGS. 2-10, system 100 for delivering glutinous substance 168 from cartridge 166 to surface 172 of workpiece 170 is disclosed. System 100 comprises robot 152, comprising tool interface 156. System 100 also comprises applicator 154 and apparatus 102 for delivering glutinous substance 168 from cartridge to applicator 154. Apparatus 102 comprises robot interface 136, configured to be coupled to tool interface 156 of robot 152. Apparatus 102 also comprises sleeve 106, comprising central axis 121. Sleeve 106 further comprises inlet 124 and outlet 128, opposite inlet 124. Sleeve 106 is configured to receive cartridge 166 through inlet 124. Apparatus 102 also comprises pressure-cap assembly 104, coupled to sleeve 106. Pressure-cap assembly 104 comprises pressure cap 110, proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124 of sleeve 106. Pressure cap 110 comprises pressure input 118, through which pressure is selectively applied to glutinous substance 168 in cartridge 166 when cartridge 166 is received within sleeve 106, pressure cap 110 is in the closed position, and leading end 167 of cartridge 166 is in sealed engagement with applicator 154. Pressure-cap assembly 104 also comprises actuator 114, coupled to pressure cap 110 and to sleeve 106. Actuator 114 is selectively operable to move pressure cap 110 relative to sleeve 106 between, inclusively, the closed position and the open position. Apparatus 102 also comprises applicator interface 108, proximate outlet 128 of sleeve 106. Applicator interface 108 is configured to releasably hold applicator 154 so that applicator 154 is sealingly coupled with leading end 167 of cartridge 166 when pressure cap 110 is in the closed position. System 100 further includes controller 157, operatively coupled with robot 152 and apparatus 102. The preceding subject matter of this paragraph characterizes example 28 of the present disclosure.

System 100 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. Applicator interface 108 enables secure attachment of applicator 154 to apparatus 102 and quick release of applicator 154 from apparatus 102. With cartridge 166 received within sleeve 106 and pressure cap 110 in a closed position, cartridge 166 is sealed with applicator 154 to enable sealed flow of glutinous substance 168 from cartridge 166 to applicator 154 via the application of pressure to glutinous substance 168 in cartridge 166.

Apparatus 102 can include pressure tubes 138 to facilitate the communication of pressure to and from various components of apparatus 102. For example, pressure tubes 138 may communicate pressure to pressure inputs 118. As an example, pressure tubes 138 may communicate pressure to and from actuator 114 to facilitate selective operation of actuator 114. Also, pressure tubes 138 may communicate pressure to pressure input 130 to facilitate ejection of cartridge 166 from sleeve 106, such as after glutinous substance 168 has been emptied from cartridge 166.

In some examples, various components of apparatus 102 are fixed to sleeve 106 via clamps 116, 132, 150. For example, actuator 114 is fixed to sleeve 106 by clamp 116, applicator interface 108 is fixed to sleeve 106 by clamps 132, and brackets 148 are fixed to sleeve 106 by clamps 132, 150. According to other examples, the various components of apparatus 102 are fixed to sleeve 106 using other fixation techniques, such as fastening, adhering, co-forming, and the like.

Actuator 114 can be any of various actuators known in the art, such as linear actuators and rotary actuators, powered in any of various ways, such as pneumatically, electromagnetically, electrically, hydraulically, and the like. Pressure input 118 can be a pneumatic fitting in some examples.

Referring generally to, e.g., FIG. 1 and particularly to FIGS. 4 and 6-8, system 100 further comprises pressure source 162. Controller 157 is configured to cause pressure source 162 to selectively provide pressure to tool interface 156 of robot 152. Tool interface 156 of robot 152 is configured to pneumatically communicate the pressure, received from pressure source 162, to robot interface 136 of apparatus 102. Robot interface 136 of apparatus 102 is configured to pneumatically communicate the pressure, received from tool interface 156 of robot 152, to pressure input 118 of pressure cap 110 and to actuator 114. The preceding subject matter of this paragraph characterizes example 29 of the present disclosure, wherein example 29 also includes the subject matter according to example 28, above.

Robot interface 136 and tool interface 136 enable reliable pneumatic communication of pressure from pressure source 162 to apparatus 102 for pneumatic operation of apparatus 102. Furthermore, robot interface 136 and tool interface 156 promote quick coupling of apparatus 102 with robot 152 and quick releasing of apparatus 102 from robot 152. Additionally, robot interface 136 and tool interface 156 facilitate quick coupling of communication lines between apparatus 102 and robot 152. For example, robot interface 136 and tool interface 156 may enable automated coupling of apparatus 102 with robot 152 and automated releasing of apparatus 102 from robot 152.

Referring generally to, e.g., FIG. 1 and particularly to FIGS. 2-4 and 6-8, system 100 further comprises at least one of pressure sensor 158, configured to sense pressure of glutinous substance 168 in applicator 154, or temperature sensor 160, configured to sense temperature of glutinous substance 168 in applicator 154. System 100 also comprises at least one of pressure-signal conditioner 144, electrically coupled to pressure sensor 158, or temperature-signal conditioner 142, electrically coupled to temperature sensor 160. Controller 157 is operatively coupled with pressure source 162 and further configured to regulate the pressure of glutinous substance 168 in applicator 154. That pressure is communicated from pressure source 162 to pressure input 118 of pressure cap 110 via tool interface 156 of robot 152 and robot interface 136 of apparatus 102. Controller 157 is configured to regulate the pressure of glutinous substance 168 in applicator 154 responsive to, at least in part, at least one of pressure data, received from pressure-signal conditioner 144, or temperature data, received from temperature-signal conditioner 142. The preceding subject matter of this paragraph characterizes example 30 of the present disclosure, wherein example 30 also includes the subject matter according to example 29, above.

Pressure sensor 158 enables detection of the pressure of glutinous substance 168 in applicator 154. The pressure of glutinous substance 168 in applicator 154 detected by pressure sensor 158 can be used by controller 157 to control the rate at which glutinous substance 168 flows from cartridge 166 to applicator 154. Further, pressure sensor 158 being configured to be coupled to applicator 154 allows pressure sensor 158 to remain part of apparatus 102 while being decoupleable from applicator 154 to remove applicator 154 from apparatus 102 or being coupleable to applicator 154 after applicator 154 is coupled to apparatus 102.

Pressure-signal conditioner 144 enables communication of pressure-related information from pressure sensor 158 to controller 157 in a format useable by controller 157. Accordingly, pressure-signal conditioner 144 provides data format conversion functionality on-board apparatus 102, rather than at controller 157.

Temperature sensor 160 enables detection of the temperature of glutinous substance 168 in applicator 154. The temperature of glutinous substance 168 in applicator 154 detected by temperature sensor 160 can be used to control the rate at which glutinous substance 168 flows from cartridge 166 to applicator 154. Further, temperature sensor 160 being configured to be coupled to applicator 154 allows temperature sensor 160 to remain part of apparatus 102 while being decoupleable from applicator 154 to remove applicator 154 from apparatus 102 or being coupleable to applicator 154 after applicator 154 is coupled to apparatus 102.

Temperature-signal conditioner 142 enables communication of temperature-related information from temperature sensor 160 to controller 157 in a format useable by controller 157. Accordingly, temperature-signal conditioner 142 provides data format conversion functionality on-board apparatus 102, rather than at controller 157.

Using controller 157 to regulate the pressure communicated from pressure source 162 responsive to, at least in part, at least one of pressure data, received from pressure-signal conditioner 144, or temperature data, received from temperature-signal conditioner 142 facilitates a precise and predictable flow of glutinous substance 168 from applicator to surface 172 of workpiece 170.

Referring generally to, e.g., FIG. 1 and particularly to FIGS. 2, 3, and 6-8, the pressure, communicated to pressure input 118, is that inside sleeve 106. A delivery rate of glutinous substance 168 from cartridge 166 to applicator 254 is proportional to the pressure inside sleeve 106. The preceding subject matter of this paragraph characterizes example 31 of the present disclosure, wherein example 31 also includes the subject matter according to example 30, above.

Regulating the pressure communicated from pressure source 162 to regulate the delivery rate of glutinous substance 168 from cartridge 166 to applicator 154 facilitates a precise and predictable flow of glutinous substance 168 from applicator to surface 172 of workpiece 170.

Referring generally to, e.g., FIG. 1 and particularly to FIGS. 6 and 7, system 100 further comprises input/output connector 140, communicatively coupling the at least one of pressure-signal conditioner 144 or temperature-signal conditioner 142 with controller 157. The preceding subject matter of this paragraph characterizes example 32 of the present disclosure, wherein example 32 also includes the subject matter according to any one of examples 30 or 31, above.

Input/output connector 140 facilitates a convenient and reliable electrical-communication connection between controller 157 and at least one of pressure-signal conditioner 144 or temperature-signal conditioner 142.

Referring generally to, e.g., FIG. 1 and particularly to FIGS. 4 and 6-8, the system further comprises pressure amplifier 165, pneumatically coupled with pressure source 162. The pressure, generated by pressure source 162, is a first pressure. Pressure amplifier 165 is configured to increase the first pressure to a second pressure. Controller 157 is further configured to cause pressure source 162 to selectively provide the first pressure to tool interface 156 of robot 152 and to cause pressure amplifier 165 to selectively provide the second pressure to tool interface 156 of robot 152. Tool interface 156 of robot 152 is configured to pneumatically communicate the first pressure, received from pressure source 162, to robot interface 136 of apparatus 102 and to pneumatically communicate the second pressure, received from pressure amplifier 165, to robot interface 136 of apparatus 102. Robot interface 136 of apparatus 102 is configured to pneumatically communicate the first pressure, received from tool interface 156 of robot 152, to actuator 114 and to pneumatically communicate the second pressure, received from tool interface 156 of robot 152, to first pressure input 118 of pressure cap 110. The preceding subject matter of this paragraph characterizes example 33 of the present disclosure, wherein example 33 also includes the subject matter according to any one of examples 29-32, above.

Air amplifier 165 enables pneumatic communication of multiple pressures from pressure source 162 to apparatus 102 for pneumatically operating multiple components of apparatus 102. Robot interface 136 and tool interface 156 promote quick coupling of apparatus 102 with robot 152 and quick releasing of apparatus 102 from robot 152. Additionally, robot interface 136 and tool interface 156 facilitate quick coupling of communication lines between apparatus 102 and robot 152. For example, robot interface 136 and tool interface 156 may enable automated coupling of apparatus 102 with robot 152 and automated releasing of apparatus 102 from robot 152.

Air amplifier 165 can be configured to provide pressures up to, for example, 300 psi. In some examples, air amplifier 165 includes a manifold with independently-controllable valves each configured to regulate air flow to different locations of tool interface 156.

Referring generally to FIG. 1 and particularly to, e.g., FIGS. 5 and 8-10, applicator interface 108 comprises receptacle 182. Applicator 154 comprises receptacle interface 198. Receptacle 182 of applicator interface 108 and receptacle interface 198 of applicator 154 have a running fit therebetween. The preceding subject matter of this paragraph characterizes example 34 of the present disclosure, wherein example 34 also includes the subject matter according to any one of examples 28-34, above.

The running fit between receptacle 182 of applicator interface 108 and receptacle interface 198, along with retainer 184, ensures applicator 154 is securely coupled to applicator interface 108 by providing a sufficiently tight fit between receptacle 182 of applicator interface 108 and receptacle interface 198 of applicator 154 to prevent noticeable play therebetween. As used herein, a running fit between two parts produces no noticeable clearance between these parts after assembly.

Referring generally to FIG. 1 and particularly to, e.g., FIGS. 5 and 8-10, receptacle 182 of applicator interface 108 and receptacle interface 198 of applicator 154 have cross-sectionally complementary shapes. The preceding subject matter of this paragraph characterizes example 35 of the present disclosure, wherein example 35 also includes the subject matter according to example 34, above.

Receptacle 182 of applicator interface 108 having a shape that is cross-sectionally complementary to a shape of receptacle interface 198 of applicator 154, along with retainer 184, ensures applicator 154 is securely coupled to applicator interface 108 by providing a relatively tight fit between receptacle 182 of applicator interface 108 and receptacle interface 198 of applicator 154.

Referring generally to FIG. 1 and particularly to, e.g., FIGS. 5 and 8-10, a cross-section of receptacle 182 of applicator interface 108, perpendicular to central axis 121 of sleeve 106, is non-circular. The preceding subject matter of this paragraph characterizes example 36 of the present disclosure, wherein example 36 also includes the subject matter according to any one of examples 34 or 35, above.

The cross-section of receptacle 182 of applicator interface 108 being non-circular ensures applicator 154 does not rotate relative to applicator interface 108.

Referring generally to FIG. 1 and particularly to, e.g., FIGS. 5 and 8-10, applicator interface 108 comprises retainer 184, rotatable relative to receptacle 182 of applicator interface 108 and receptacle interface 198 of applicator 154 with receptacle interface 198 of applicator 154 received within receptacle 182 of applicator interface 108. Retainer 184 of applicator interface 108 is rotatable between at least one first position, in which retainer 184 engages receptacle interface 198 of applicator 154 to retain applicator 154, and at least one second position, in which retainer 184 provides clearance sufficient for receptacle interface 198 of applicator 154 to be removed from or received within receptacle 182 of applicator interface 108. The preceding subject matter of this paragraph characterizes example 37 of the present disclosure, wherein example 37 also includes the subject matter according to any one of examples 34-36, above.

Use of retainer 184 allows for quick and easy secure coupling of applicator 154 to applicator interface 108 and decoupling of applicator 154 from applicator interface 108. Retainer 184 can be reoriented between the at least one retaining orientation and the at least one releasing orientation to allow for secure coupling of applicator 154 to applicator interface 108 and decoupling of applicator 154 from applicator interface 108. In one example, retainer 184 is a disk-like element that is rotatable to orient retainer 184 between the at least one retainer orientation and the at least one releasing orientation.

Referring generally to FIG. 1 and particularly to, e.g., FIG. 5, receptacle interface 198 of applicator 154 comprises receiver 199, configured to receive and sealingly engage leading end 167 of cartridge 166. The preceding subject matter of this paragraph characterizes example 38 of the present disclosure, wherein example 38 also includes the subject matter according to any one of examples 34-37, above.

Reception of leading end 167 of cartridge 166 in receiver 199 of receptacle interface 198 of applicator 154 and sealing engagement of leading end 167 of cartridge 166 in receiver 199 of receptacle interface 198 of applicator 154 ensures glutinous substance 168 does not leak from interface between leading end 167 of cartridge 166 and applicator 154 as glutinous substance 168 flows from cartridge 166 to applicator 154.

Referring generally to FIGS. 1-10 and particularly to FIG. 11A, method 200 of delivering glutinous substance 168 from cartridge 166 to applicator 154 is disclosed. Method 200 comprises (block 202) receiving cartridge 166 inside sleeve 106 through inlet 124 of sleeve 106 while pressure cap 110, located proximate inlet 124 of sleeve 106, is in an open position. Cartridge 166 has leading end 167 and trailing end 169. Method 200 also comprises (block 204) moving pressure cap 110, located proximate inlet 124 of sleeve 106, into a closed position to sealingly couple pressure cap 110 with trailing end 169 of cartridge 166 and to sealingly couple applicator 154 with leading end 167 of cartridge 166. Method 200 further comprises (block 206) applying pressure to glutinous substance 168 in cartridge 166 through pressure input 118 of pressure cap 110 to urge glutinous substance 168 from cartridge 166 into applicator 154. Additionally, method 200 comprises (block 208) moving pressure cap 110 into an open position to provide clearance sufficient for removal of cartridge 166 from sleeve 106 through inlet 124 of sleeve 106. The preceding subject matter of this paragraph characterizes example 39 of the present disclosure.

Method 200 facilitates a reduction in the labor, time, and inaccuracies associated with the application of glutinous substances onto surfaces of workpieces. Cartridge 166 provides modular containment of glutinous substance 168. Sleeve 106 enables a secure coupling of cartridge 166 relative to applicator 154. Movement of pressure cap 110 between the open position and closed position allows both access to sleeve 106 for the insertion of cartridge 166 into sleeve 106 and the application of pressure to cartridge 166 for urging glutinous substance 168 out of sleeve 106. With cartridge 166 received within sleeve 106 and pressure cap 110 in a closed position, cartridge 166 is sealed with applicator 154 to enable sealed flow of glutinous substance 168 from cartridge 166 to applicator 154 via the application of pressure to glutinous substance 168 in cartridge 166.

Referring generally to, e.g., FIGS. 1-3 and 7 and particularly to FIG. 11A, according to method 200, (block 210) pressure cap 110 is pivotally coupled to arm 115. Moving pressure cap 110 into the closed position comprises (block 212) rotating arm 115 in a first rotational direction about axis 117. Axis 117 is fixed relative to sleeve 106 and perpendicular to central axis 121 of sleeve 106. Moving pressure cap 110 into the open position comprises (block 222) rotating arm 115 about axis 117 in a second rotational direction, opposite the first rotational direction. The preceding subject matter of this paragraph characterizes example 40 of the present disclosure, wherein example 40 also includes the subject matter according to example 39, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to, e.g., FIGS. 1-3 and 6 and particularly to FIG. 11A, according to method 200, moving pressure cap 110 into the closed position comprises (block 214) torsionally biasing pressure cap 110 relative to arm 115. The preceding subject matter of this paragraph characterizes example 41 of the present disclosure, wherein example 41 also includes the subject matter according to example 40, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166.

Referring generally to, e.g., FIGS. 1-4 and 7 and particularly to FIG. 11B, method 200 further comprises (block 224) releasably locking pressure cap 110 in the closed position. The preceding subject matter of this paragraph characterizes example 42 of the present disclosure, wherein example 42 also includes the subject matter according to any one of examples 39-41, above.

Releasably locking pressure cap 110 in the closed position prevents disengagement between pressure cap 110 and cartridge 166 should actuator 114 fail. In other words, in the event actuator 114 fails to urge pressure cap 110 in closed position, such as due to loss of pressure or malfunction of actuator 114, while pressure is applied to glutinous substance 168 in cartridge 166, releasably locking pressure cap 110 in the closed position prevents pressure within cartridge 116 from inadvertently moving pressure cap 110 out of the closed position.

Referring generally to, e.g., FIG. 1 and particularly to FIG. 11B, according to method 200, moving pressure cap 110 into the closed position comprises (block 226) pneumatically causing actuator 114, coupled to pressure cap 110, to have a first length. Releasably locking pressure cap 110 in the closed position comprises (block 228) mechanically locking pressure cap 110 in the closed position. The preceding subject matter of this paragraph characterizes example 43 of the present disclosure, wherein example 43 also includes the subject matter according to example 42, above.

Actuator 114 facilitates automated movement of pressure cap 110 into the closed position. Mechanically locking pressure cap 110 in the closed position provides a secure and reliable way to prevent disengagement between pressure cap 110 and cartridge 166 should actuator 114 fail.

Referring generally to, e.g., FIGS. 1-4 and 7 and particularly to FIG. 11B, according to method 200, (block 230) lock mechanism 112 is used to mechanically lock pressure cap 110 in the closed position. When lock mechanism 112 is in a locked position, (block 232) lock mechanism 112 remains in the locked position if actuator 114 loses pressure. The preceding subject matter of this paragraph characterizes example 44 of the present disclosure, wherein example 44 also includes the subject matter according to example 43, above.

Using lock mechanism 112 to mechanically lock pressure cap 110 in the closed position prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to, e.g., FIGS. 1-4 and 7 and particularly to FIG. 11B, according to method 200, moving pressure cap 110 into the open position comprises (block 234) pneumatically causing actuator 114 to have a second length different from the first length. The preceding subject matter of this paragraph characterizes example 45 of the present disclosure, wherein example 45 also includes the subject matter according to any one of examples 43 or 44, above.

Actuator 114 facilitates automated movement of pressure cap 110 into the open position.

Referring generally to, e.g., FIGS. 1, 4, and 7 and particularly to FIG. 11B, method 200 further comprises (block 236) disabling operation of actuator 114 while pressure is applied to glutinous substance 168 in cartridge 166 through pressure input 118 of pressure cap 110. The preceding subject matter of this paragraph characterizes example 46 of the present disclosure, wherein example 46 also includes the subject matter according to example 45, above.

Disabling operation of actuator 114 while pressure is being applied to glutinous substance 168 in cartridge 166 through pressure input 118 of pressure cap 110 prevents actuator 114 from inadvertently opening pressure cap 110 while cartridge 166 is pressurized. Preventing pressure cap 110 from opening while pressure is being applied to glutinous substance 168 due to inadvertent actuation of actuator 114 ensures pressure within cartridge 166 is not inadvertently released.

Referring generally to, e.g., FIGS. 1-4 and 6-8 and particularly to FIG. 11B, according to method 200, applying pressure to glutinous substance 168 in cartridge 166 through pressure input 118 of pressure cap 110 comprises (block 216) introducing a pressurized gas into cartridge 166 through pressure input 118. The preceding subject matter of this paragraph characterizes example 47 of the present disclosure, wherein example 47 also includes the subject matter according to any one of examples 39-46, above.

Introducing a pressurized gas into cartridge 166 through pressure input 118 enables precise application of pneumatic pressure to glutinous substance 168 in cartridge 166 to precisely control the flow of glutinous substance 168 out of cartridge 166 and into applicator 154. Moreover, introducing a pressurized gas into cartridge 166 through pressure input 118 facilitates the use of automated pneumatic controls to control the pneumatic operation of pressure input 118 of pressure cap 110.

Referring generally to, e.g., FIGS. 1-4 and 6-8 and particularly to FIG. 11A, method 200 further comprises (block 220) sensing a temperature of glutinous substance 168 in applicator 154. The pressure applied to glutinous substance 168 in cartridge 166 through pressure input 118 of pressure cap 110 varies responsive to, at least in part, the temperature of glutinous substance 168 sensed in applicator 154. The preceding subject matter of this paragraph characterizes example 48 of the present disclosure, wherein example 48 also includes the subject matter according to example 47, above.

Sensing the temperature of glutinous substance 168 enables detection of the temperature of glutinous substance 168 in applicator 154. The sensed temperature of glutinous substance 168 in applicator 154 can be used to control the rate at which glutinous substance 168 flows from cartridge 166 to applicator 154. Varying the pressure applied to glutinous substance 168 in cartridge 166 responsive to, at least in part, the sensed temperature of glutinous substance 168 facilitates a precise and predictable flow of glutinous substance 168 from applicator to surface 172 of workpiece 170.

Referring generally to, e.g., FIGS. 1-4 and 6-8 and particularly to FIG. 11A, method 200 further comprising (block 218) sensing a pressure of glutinous substance 168 in applicator 154. The pressure applied to glutinous substance 168 in cartridge 166 through pressure input 118 of pressure cap 110 varies responsive to, at least in part, the pressure of glutinous substance 168 sensed in applicator 154. The preceding subject matter of this paragraph characterizes example 49 of the present disclosure, wherein example 49 also includes the subject matter according to any one of examples 47 or 48, above.

Sensing the pressure of glutinous substance 168 enables detection of the pressure of glutinous substance 168 in applicator 154. The sensed pressure of glutinous substance 168 in applicator 154 can be used to control the rate at which glutinous substance 168 flows from cartridge 166 to applicator 154. Varying the pressure applied to glutinous substance 168 in cartridge 166 responsive to, at least in part, the sensed pressure of glutinous substance 168 facilitates a precise and predictable flow of glutinous substance 168 from applicator 154 to surface 172 of workpiece 170.

Referring generally to, e.g., FIGS. 1, 4, 5, 9, and 10 and particularly to FIG. 11B, method 200 further comprises (block 238) applying pressure to cartridge 166 inside sleeve 106 to eject cartridge 166 from within sleeve 106 through inlet 124 of sleeve 106 when pressure cap 110 is in the open position. The preceding subject matter of this paragraph characterizes example 50 of the present disclosure, wherein example 50 also includes the subject matter according to any one of examples 39-49, above.

Applying pressure to cartridge 166 inside sleeve 106 to eject cartridge 166 from within sleeve 106 through inlet 124 of sleeve 106 facilitates the removal of cartridge 166 from sleeve 106, such as after glutinous substance 168 has been emptied from cartridge 166. In some examples, when cartridge 166 is received within sleeve 106, because only a small portion of cartridge 166 may be accessible for gripping from outside sleeve 106 or because cartridge 166 may become at least partially stuck within sleeve 106, it may be difficult to remove cartridge 166 from sleeve 106. Pressure input 130 facilitates ease of removal of cartridge 166 from sleeve 106 by increasing pressure within sleeve 106 proximate outlet 128 of sleeve 106, which urges movement of cartridge 166 through sleeve 106 towards and out of inlet 124 of sleeve 106. Pressure cap 110 being in the open position when pressure is applied to cartridge 166 inside sleeve 106 ensures pressure cap 110 does not obstruct the ejection of cartridge 166 through inlet 124 of sleeve 106.

Referring generally to, e.g., FIGS. 1, 5, and 8-10 and particularly to FIG. 11B, method 200 further comprises (block 240) releasably retaining applicator 154 relative to sleeve 106. The preceding subject matter of this paragraph characterizes example 51 of the present disclosure, wherein example 51 also includes the subject matter according to any one of examples 39-50, above.

Releasably retaining applicator 154 relative to sleeve 106 promotes ease in removing applicator 154 relative to sleeve 106 and retaining applicator 154 relative to sleeve 106. In some examples, releasably retaining applicator 154 relative to sleeve 106 promotes interchangeability of multiple applicators 154 relative to sleeve 106.

Referring generally to, e.g., FIGS. 1, 5, and 8-10 and particularly to FIG. 11B, according to method 200, releasably retaining applicator 154 relative to sleeve 106 comprises (block 242) locating receptacle interface 198 of applicator 154 within receptacle 182 with a running fit. Receptacle 182 is fixed relative to sleeve 106. The preceding subject matter of this paragraph characterizes example 52 of the present disclosure, wherein example 52 also includes the subject matter according to example 51, above.

The running fit between receptacle 182 of applicator interface 108 and receptacle interface 198, along with retainer 184, ensures applicator 154 is securely coupled to applicator interface 108 by providing a sufficiently tight fit between receptacle 182 of applicator interface 108 and receptacle interface 198 of applicator 154 to prevent noticeable play therebetween.

Referring generally to, e.g., FIG. 1 and particularly to FIG. 11B, according to method 200, locating receptacle interface 198 of applicator 154 within receptacle 182 with the running fit comprises (block 244) 3-D printing receptacle interface 198 of applicator 154 into a shape larger than receptacle 182 and (block 246) machining away a portion of receptacle interface 198 of applicator 154. The preceding subject matter of this paragraph characterizes example 53 of the present disclosure, wherein example 53 also includes the subject matter according to example 52, above.

3-D printing receptacle interface 198 of applicator 154 into a shape larger than receptacle 182 and machining away a portion of receptacle interface 198 of applicator 154 reduces manufacturing and material costs, while ensuring receptacle interface 198 of applicator 154 and receptacle 182 provide a running fit.

Examples of the present disclosure may be described in the context of aircraft manufacturing and service method 1100 as shown in FIG. 12 and aircraft 1102 as shown in FIG. 13. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of delivering a glutinous substance from a cartridge to an applicator, the method comprising steps of:
   receiving the cartridge inside a sleeve through an inlet of the sleeve while a pressure cap, located proximate the inlet of the sleeve, is in an open position, wherein the cartridge has a leading end and a trailing end;
   moving the pressure cap, located proximate the inlet of the sleeve, into a closed position to sealingly couple the pressure cap with the trailing end of the cartridge and to sealingly couple the applicator with the leading end of the cartridge;
   applying pressure to the glutinous substance in the cartridge through a pressure input of the pressure cap to urge the glutinous substance from the cartridge into the applicator;
   moving the pressure cap into the open position to provide clearance sufficient for removal of the cartridge from the sleeve through the inlet of the sleeve; and
   releasably locking the pressure cap in the closed position; wherein:
   the pressure cap is pivotally coupled to an arm;
   the step of moving the pressure cap into the closed position comprises rotating the arm in a first rotational direction about an axis that is fixed relative to the sleeve and that is perpendicular to a central axis of the sleeve; and
   the step of moving the pressure cap into the open position comprises rotating the arm about the axis in a second rotational direction, opposite the first rotational direction.

2. The method according to claim 1, wherein the step of moving the pressure cap into the closed position comprises torsionally biasing the pressure cap relative to the arm.

3. The method according to claim 1, wherein:
   the step of moving the pressure cap into the closed position comprises pneumatically causing an actuator coupled to the pressure cap, to have a first length; and
   the step of releasably locking the pressure cap in the closed position comprises mechanically locking the pressure cap in the closed position.

4. The method according to claim 3, wherein:
   a lock mechanism is used to mechanically lock the pressure cap in the closed position; and
   when the lock mechanism is in a locked position, the lock mechanism remains in the locked position if the actuator loses pressure.

5. The method according to claim 3, wherein:
   moving the pressure cap into the open position comprises pneumatically causing the actuator to have a second length different from the first length.

6. The method according to claim 5, further comprising disabling operation of the actuator while pressure is applied to the glutinous substance in the cartridge through the pressure input of the pressure cap.

7. The method according to claim 1, wherein the step of applying pressure to the glutinous substance in the cartridge through the pressure input of the pressure cap comprises introducing a pressurized gas into the cartridge through the pressure input.

8. The method according to claim 7, further comprising sensing a temperature of the glutinous substance in the applicator, wherein the pressure applied to the glutinous substance in the cartridge through the pressure input of the pressure cap varies responsive to, at least in part, the temperature of the glutinous substance sensed in the applicator.

9. The method according to claim 7, further comprising sensing a pressure of the glutinous substance in the applicator, wherein the pressure applied to the glutinous substance in the cartridge through the pressure input of the pressure cap varies responsive to, at least in part, the pressure of the glutinous substance sensed in the applicator.

10. The method according to claim 1, further comprising applying pressure to the cartridge inside the sleeve to eject the cartridge from within the sleeve through the inlet of the sleeve when the pressure cap is in the open position.

11. The method according to claim 1, further comprising a step of releasably retaining the applicator relative to the sleeve.

12. The method according to claim 11, wherein the step of releasably retaining the applicator relative to the sleeve comprises a step of locating a receptacle interface of the applicator within a receptacle, fixed relative to the sleeve, with a running fit.

13. The method according to claim 12, wherein the step of locating the receptacle interface of the applicator within the receptacle with the running fit comprises:
   3-D printing the receptacle interface of the applicator into a shape larger than the receptacle; and
   machining away a portion of the receptacle interface of the applicator.

14. The method according to claim 8, further comprising sensing a pressure of the glutinous substance in the applicator, wherein the pressure applied to the glutinous substance in the cartridge through the pressure input of the pressure cap varies responsive to, at least in part, the pressure of the glutinous substance sensed in the applicator.

15. The method according to claim 2, wherein the step of applying pressure to the glutinous substance in the cartridge through the pressure input of the pressure cap comprises introducing a pressurized gas into the cartridge through the pressure input.

16. The method according to claim 7, further comprising applying pressure to the cartridge inside the sleeve to eject the cartridge from within the sleeve through the inlet of the sleeve when the pressure cap is in the open position.

17. The method according to claim 2, further comprising releasably locking the pressure cap in the closed position.

18. The method according to claim 4, wherein the step of moving the pressure cap into the open position comprises pneumatically causing the actuator to have a second length different from the first length.

19. A method of delivering a glutinous substance from a cartridge to an applicator, the method comprising:
   receiving the cartridge inside a sleeve through an inlet of the sleeve while a pressure cap, located proximate the inlet of the sleeve, is in an open position, wherein the cartridge has a leading end and a trailing end;
   moving the pressure cap, located proximate the inlet of the sleeve, into a closed position to sealingly couple the pressure cap with the trailing end of the cartridge and to sealingly couple the applicator with the leading end of the cartridge;
   applying pressure to the glutinous substance in the cartridge through a pressure input of the pressure cap to urge the glutinous substance from the cartridge into the applicator;
   moving the pressure cap into the open position to provide clearance sufficient for removal of the cartridge from the sleeve through the inlet of the sleeve; and
   rotating a retainer, relative to a receptacle that is cross-sectionally complementary to a receptacle interface of the applicator, to releasably retain the applicator so that the applicator is sealingly coupled with the leading end of the cartridge with the pressure cap in the closed position.

20. The method according to claim 19, further comprising releasably locking the pressure cap in the closed position, wherein:
   the pressure cap is pivotally coupled to an arm;
   the step of moving the pressure cap into the closed position comprises rotating the arm in a first rotational direction about an axis that is fixed relative to the sleeve and that is perpendicular to a central axis of the sleeve; and
   the step of moving the pressure cap into the open position comprises rotating the arm about the axis in a second rotational direction, opposite the first rotational direction.

* * * * *